(12) United States Patent
Shinohara et al.

(10) Patent No.: US 9,423,595 B2
(45) Date of Patent: Aug. 23, 2016

(54) IMAGING LENS AND IMAGING APPARATUS EQUIPPED WITH THE IMAGING LENS

(71) Applicant: FUJIFILM Corporation, Tokyo (JP)

(72) Inventors: Yoshikazu Shinohara, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 93 days.

(21) Appl. No.: 14/604,010

(22) Filed: Jan. 23, 2015

(65) Prior Publication Data
US 2015/0212298 A1    Jul. 30, 2015

(30) Foreign Application Priority Data
Jan. 28, 2014    (JP) ................................. 2014-013148

(51) Int. Cl.
G02B 13/18 (2006.01)
G02B 3/02 (2006.01)
G02B 13/00 (2006.01)
G02B 9/64 (2006.01)

(52) U.S. Cl.
CPC .............. *G02B 13/0045* (2013.01); *G02B 9/64* (2013.01)

(58) Field of Classification Search
CPC .............................. G02B 13/0045; G02B 9/64
USPC .................... 359/708, 713, 751, 755
See application file for complete search history.

(56) References Cited

U.S. PATENT DOCUMENTS 8,599,495 B1 * 12/2013 Tsai ................... G02B 13/0045
359/708

FOREIGN PATENT DOCUMENTS

JP    2012-155223    8/2012

* cited by examiner

*Primary Examiner* — Alicia M Harrington
(74) *Attorney, Agent, or Firm* — Young & Thompson

(57) ABSTRACT

An imaging lens is essentially constituted by seven lenses, including: a positive first lens having a convex surface toward the object side; a second lens, of which at least one surface is of an aspherical shape; a third lens, of which at least one surface is of an aspherical shape; a fourth lens, of which at least one surface is of an aspherical shape; a positive fifth lens of a meniscus shape with a convex surface toward the image side; a sixth lens, of which at least one surface is of an aspherical shape; and a negative seventh lens having a concave surface toward the image side, provided in this order from the object side. The imaging lens satisfies a predetermined conditional formula.

20 Claims, 12 Drawing Sheets

ND IMAGING APPARATUS
IMAGING LENS AND IMAGING APPARATUS EQUIPPED WITH THE IMAGING LENS

CROSS REFERENCE TO RELATED APPLICATIONS

The present application claims priority under 35 U.S.C. §119 to Japanese Patent Application No. 2014-013148 filed on Jan. 28, 2014. The above application is hereby expressly incorporated by reference in its entirety into the present application.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. In addition, imaging lenses having configurations that include six or more lenses have also been improved, in order to further improve performance. For example, Japanese Unexamined Patent Publication No. 2012-155223 proposes an imaging lens with a seven lens configuration

DISCLOSURE OF THE INVENTION

Meanwhile, there is demand for wider angles of view in addition to demand for shorter total lengths, in imaging lenses having comparatively short total lengths such as those for use in smart phones, tablet terminals, and the like.

However, the imaging lens disclosed in Japanese Unexamined Patent Publication No. 2012-155223 has a small angle of view, and it is difficult for this imaging lens to satisfy the demand for a wider angle of view.

The present invention has been developed in view of the foregoing points. The object of the present invention is to provide an imaging lens that can achieve a widening of the angle of view while realizing a shortening of the total length and high imaging performance from a central angle of view to peripheral angles of view. It is another object of the present invention to provide an imaging apparatus equipped with the lens, which is capable of obtaining high resolution photographed images.

An imaging lens of the present invention consists essentially of seven lenses, including:
a first lens having a positive refractive power and a convex surface toward the object side;
a second lens, of which at least one surface is of an aspherical shape;
a third lens, of which at least one surface is of an aspherical shape;
a fourth lens, of which at least one surface is of an aspherical shape;
a fifth lens having a positive refractive power and is of a meniscus shape with a convex surface toward the image side;
a sixth lens, of which at least one surface is of an aspherical shape; and
a seventh lens having a negative refractive power and a concave surface toward the image side, provided in this order from the object side;
the imaging lens satisfying the following conditional formula:

$$-1.25 < f/f7 < -0.5 \quad (1)$$

wherein f is the focal length of the entire system, and f7 is the focal length of the seventh lens.

Note that in the imaging lens of the present invention, the expression "consists essentially of seven lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the seven lenses. In addition, the shapes of the surfaces and the signs of the refractive powers of the lenses will be considered in the paraxial region for those that include aspherical surfaces.

The optical performance of the imaging lens of the present invention can be further improved by adopting the following favorable configurations.

It is preferable for the second lens to have a negative refractive power in the imaging lens of the present invention.

In addition, it is preferable for the third lens to have a positive refractive power in the imaging lens of the present invention.

In addition, it is preferable for the fourth lens to have a negative refractive power in the imaging lens of the present invention.

In addition, it is preferable for the seventh lens to be of a meniscus shape having a convex surface toward the object side in the imaging lens of the present invention.

In addition, it is preferable for the first lens to be of a meniscus shape having a convex surface toward the object side in the imaging lens of the present invention.

In addition, the sixth lens may be of a meniscus shape having a convex surface toward the object side in the imaging lens of the present invention.

In addition, it is preferable for the fourth lens to be of a biconcave shape in the imaging lens of the present invention.

In addition, the first lens and the second lens may be cemented together and the joint surface between the first lens and the second lens may be of an aspherical shape.

The imaging lens of the present invention may satisfy one or arbitrary combinations of Conditional Formulae (1-1) and (1-2), Conditional Formulae (2) through (2-2), Conditional Formula (3), Conditional Formulae (4) and (4-1), and Conditional Formulae (5) and (5-1) below.

$$-1.24 < f/f7 < -0.7 \tag{1-1}$$

$$-1.2 < f/f7 < -0.8 \tag{1-2}$$

$$-0.6 < f/f6 < 0.3 \tag{2}$$

$$-0.45 < f/f6 < 0.15 \tag{2-1}$$

$$-0.3 < f/f6 < 0.1 \tag{2-2}$$

$$0 < f/f3 < 0.35 \tag{3}$$

$$0.5 < f \cdot \tan \omega / L7r < 10 \tag{4}$$

$$1.5 < f \cdot \tan \omega / L7r < 5 \tag{4-1}$$

$$0.15 < (L7f - L7r)/(L7f + L7r) < 0.55 \tag{5}$$

$$0.3 < (L7f - L7r)/(L7f + L7r) < 0.55 \tag{5-1}$$

wherein f is the focal length of the entire system, f7 is the focal length of the seventh lens, f6 is the focal length of the sixth lens, f3 is the focal length of the third lens, ω is the half value of a maximum angle of view when focused on an object at infinity, L7r is the paraxial radius of curvature of the surface of the seventh lens toward the image side, and L7f is the paraxial radius of curvature of the surface of the seventh lens toward the object side.

An imaging apparatus of the present invention is equipped with the imaging lens of the present invention.

According to the imaging lens of the present invention, the configuration of each lens element is optimized within a lens configuration having seven lenses as a whole, and the configurations of the first, the fifth, and the seventh lenses are favorably configured in particular. Therefore, a lens system that can achieve a shortening of the total length and a widening of the angle of view, and that realizes high imaging performance from a central angle of view to peripheral angles of view can be realized.

The imaging apparatus of the present invention is equipped with the imaging lens of the present invention. Therefore, the imaging apparatus of the present invention is capable of obtaining high resolution photographed images.

BEST MODE FOR CARRYING OUT THE INVENTION

Hereinafter, embodiments of the present invention will be described in detail with reference to the attached drawings.

Figure 1:
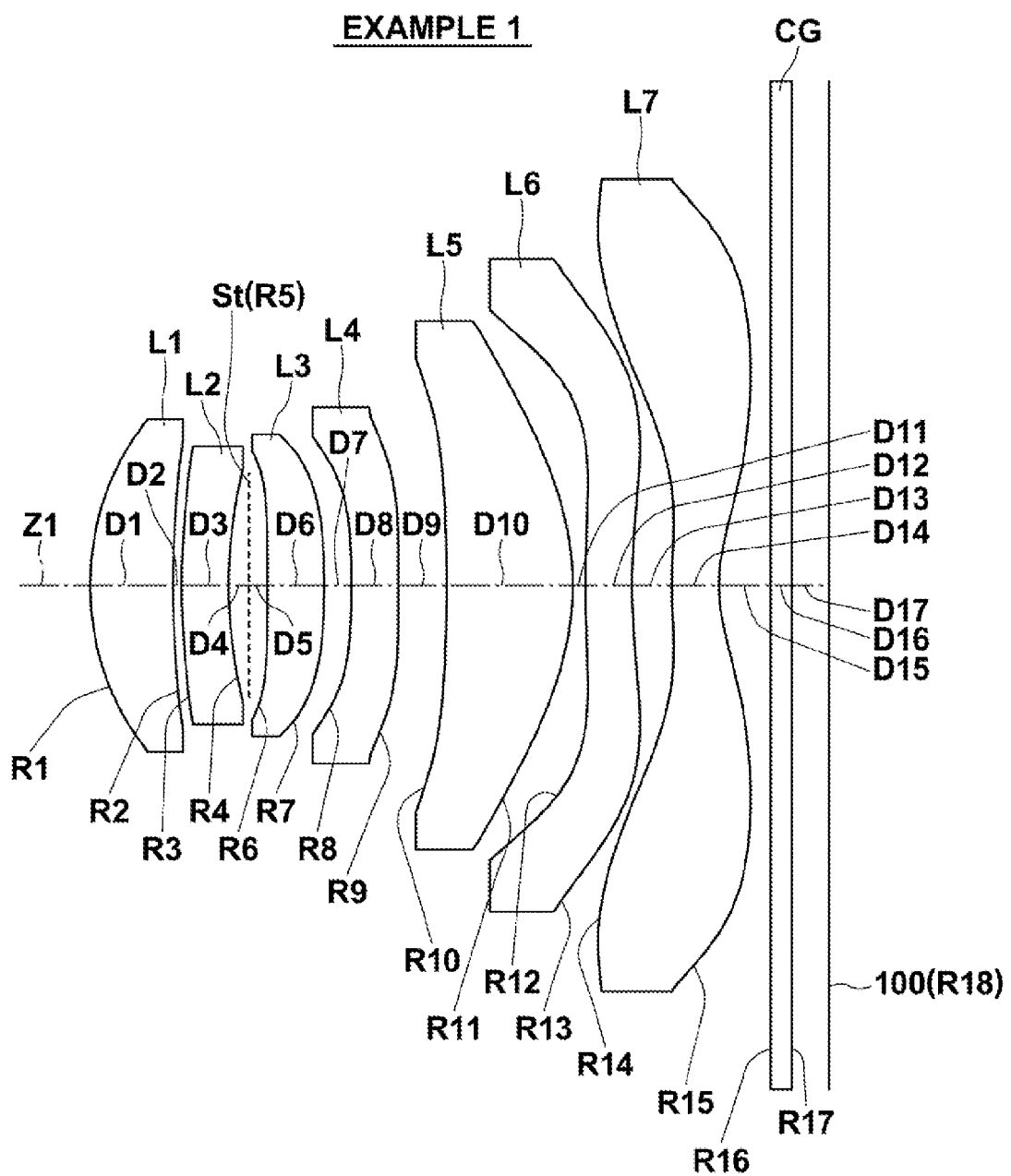
FIG. 1 is a sectional diagram that illustrates a first example of the configuration of an imaging lens according to an embodiment of the present invention, and corresponds to a lens of Example 1.
Figure 2:
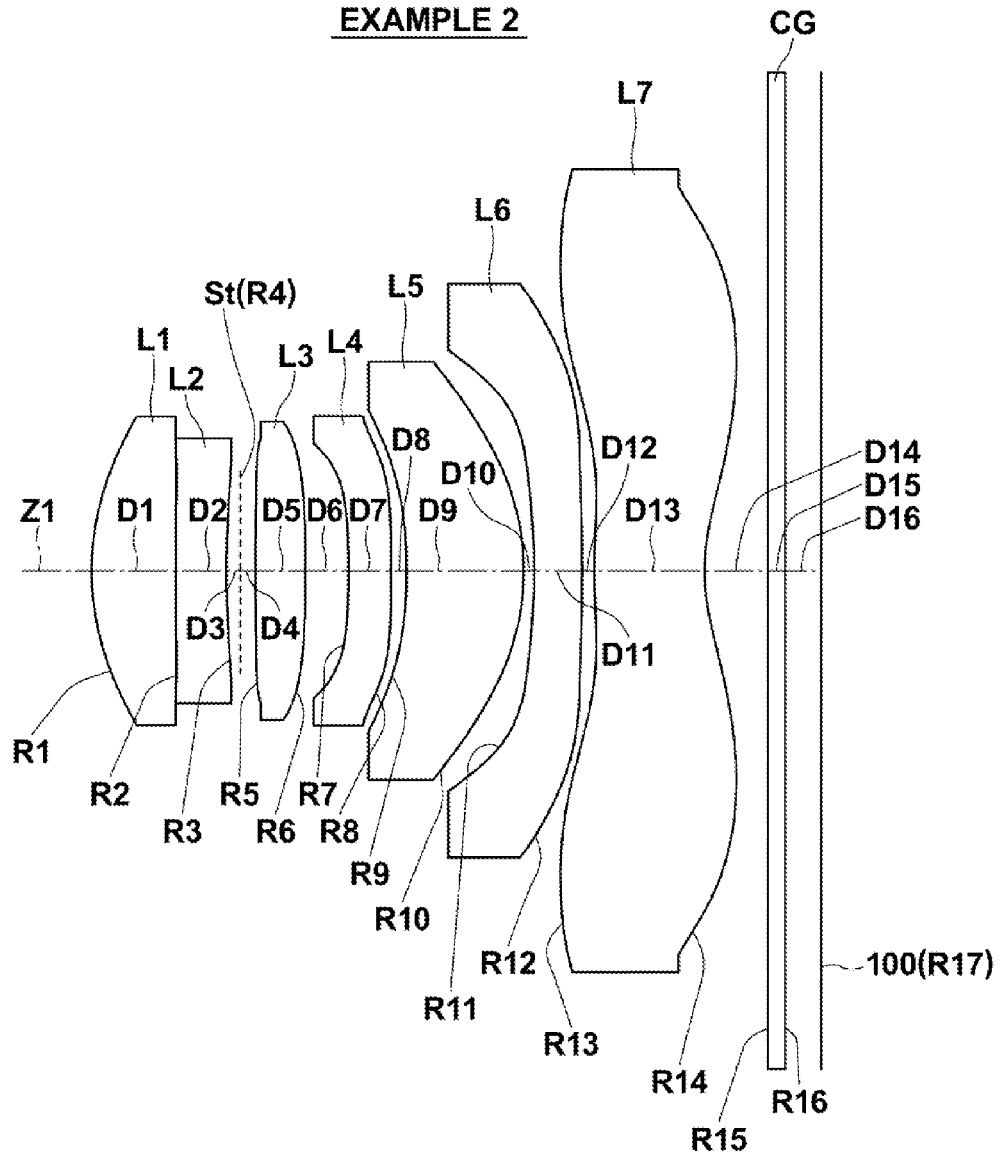
FIG. 2 is a sectional diagram that illustrates a second example of the configuration of an imaging lens according to an embodiment of the present invention, and corresponds to a lens of Example 2.
Figure 3:
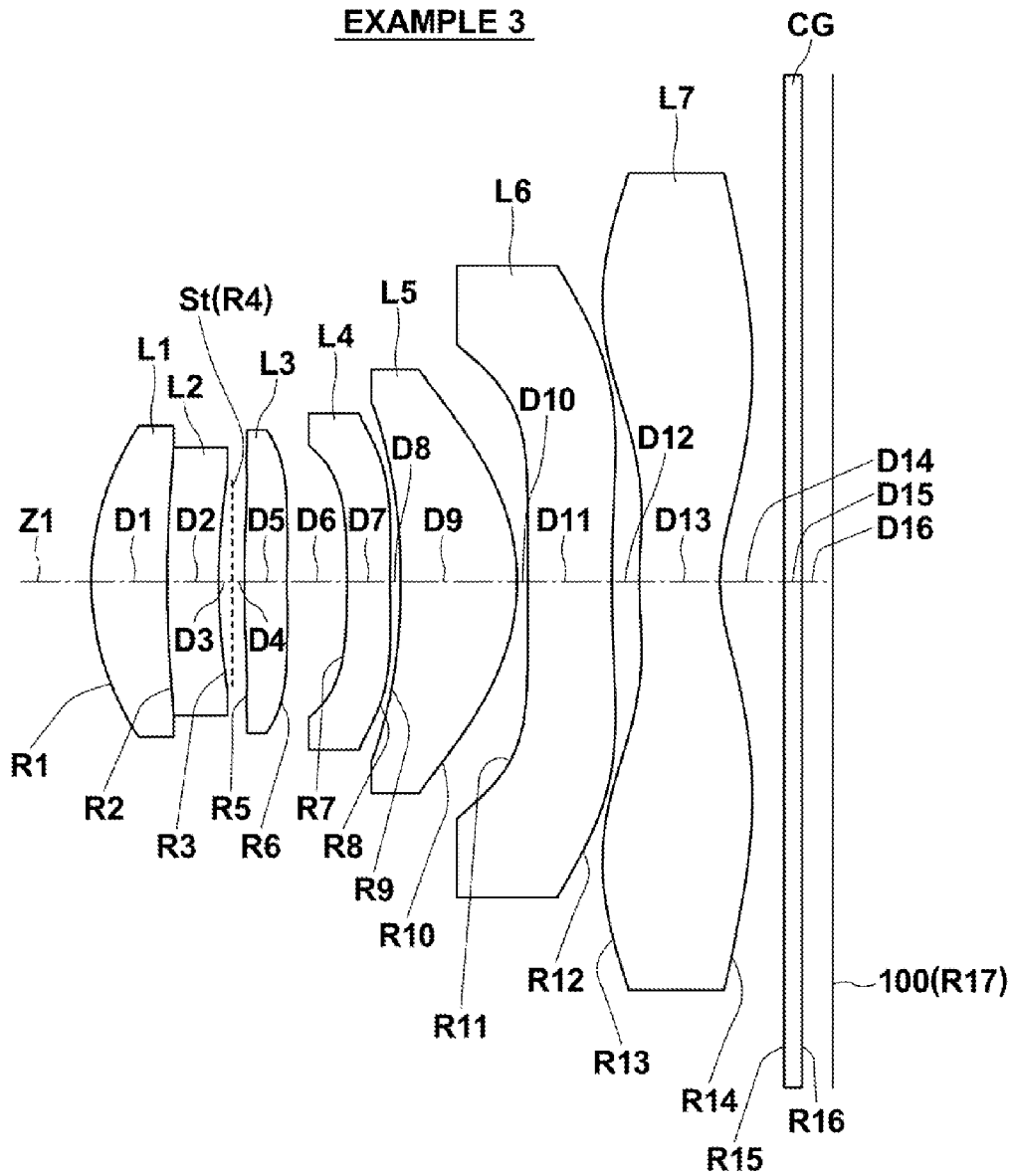
FIG. 3 is a sectional diagram that illustrates a third example of the configuration of an imaging lens according to an embodiment of the present invention, and corresponds to a lens of Example 3.
Figure 4:
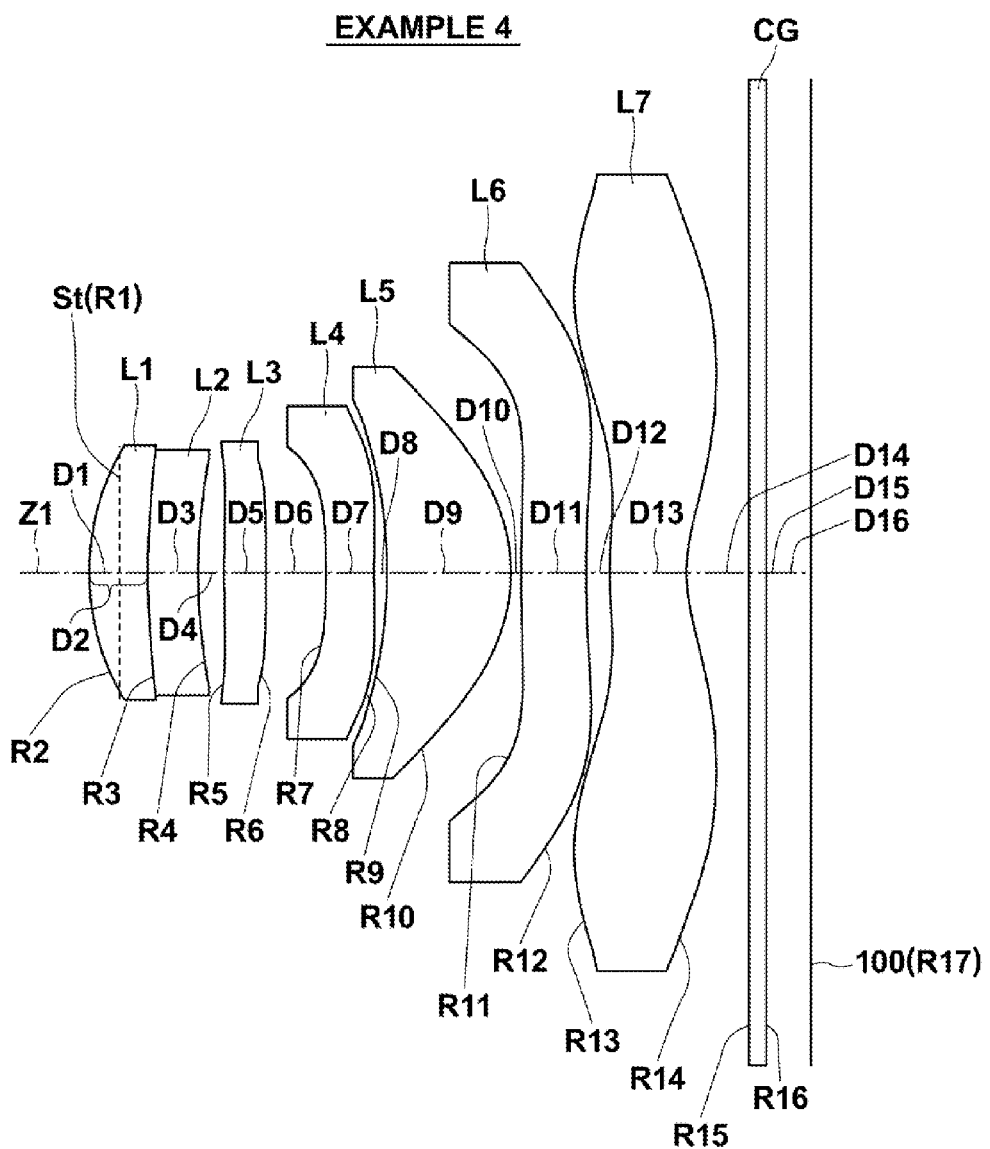
FIG. 4 is a sectional diagram that illustrates a fourth example of the configuration of an imaging lens according to an embodiment of the present invention, and corresponds to a lens of Example 4.
Figure 5:
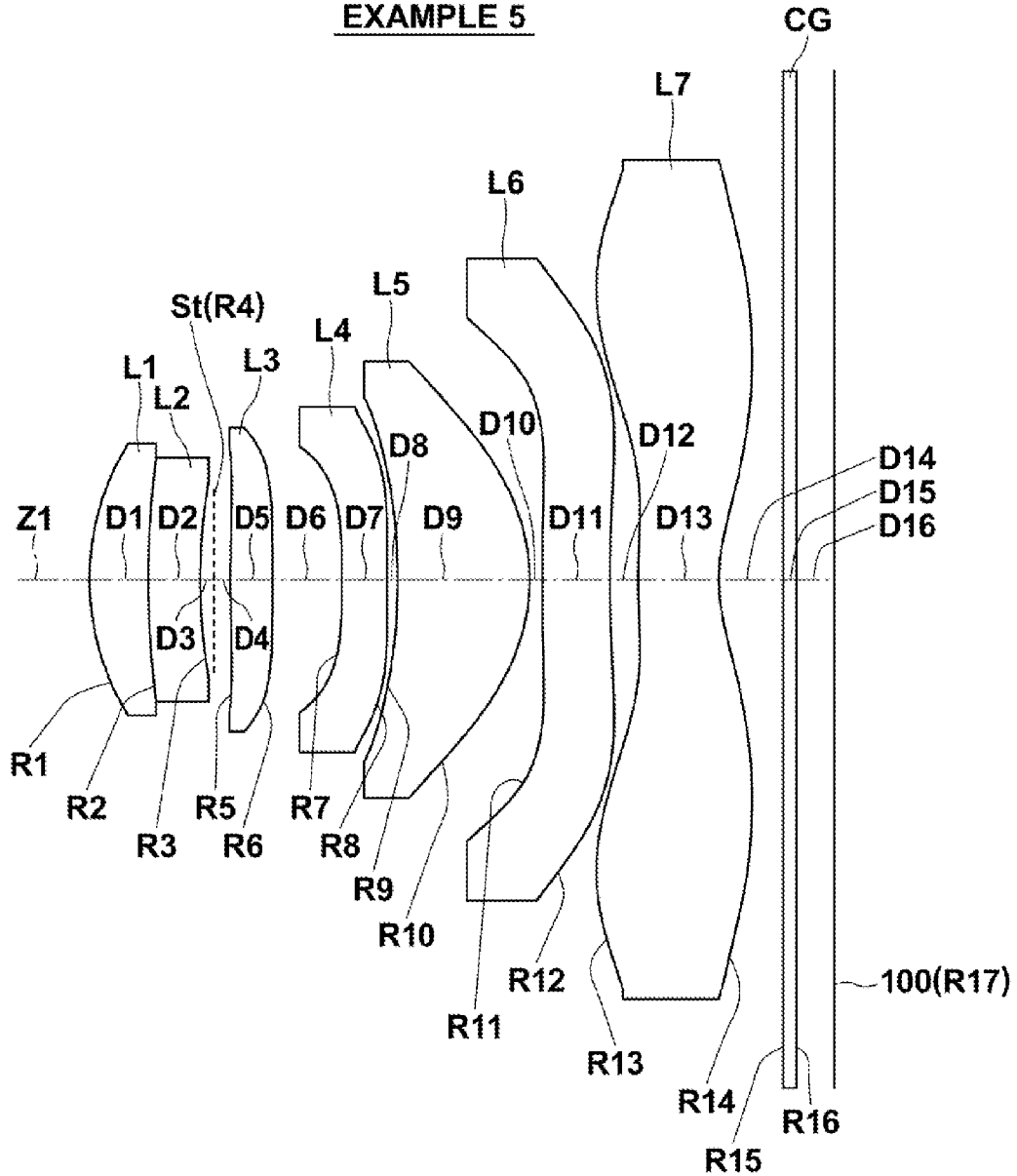
FIG. 5 is a sectional diagram that illustrates a fifth example of the configuration of an imaging lens according to an embodiment of the present invention, and corresponds to a lens of Example 5.
Figure 6:
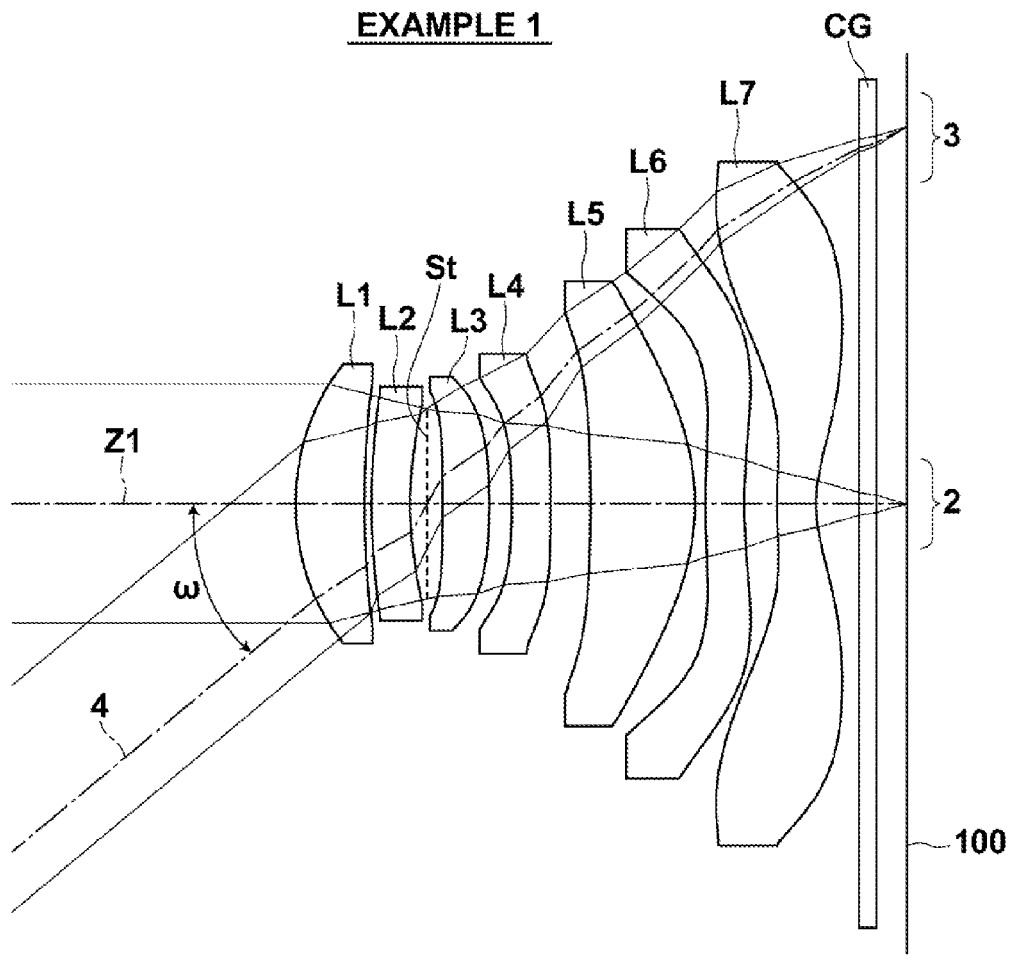
FIG. 6 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 5 are sectional diagrams that illustrate second through fifth examples of lens configurations that correspond to Numerical Examples 2 through 5 (Table 3 through Table 10). In FIGS. 1 through 5, the symbol Ri represents the radii of curvature of ith surfaces, i being lens surface numbers that sequentially increase from the object side to the image side, with the surface of a lens element most toward the object side designated as first. The symbol Di represents the distances between an ith surface and an i+1 st surface along an optical axis Z1. Note that the basic configurations of the examples are the same, and therefore a description will be given of the imaging lens of FIG. 1 as a base, and the examples of FIGS. 2 through 5 will also be described as necessary. In addition, FIG. 6 is a diagram that illustrates the paths of light rays that pass through the imaging lens of FIG. 1. FIG. 6 illustrates the paths of an axial light beam 2 and a maximum angle of view light beam 3 in a state focused on an object at a distance of infinity, as well as a half value ω of a maximum angle of view. Note that with respect to the maximum angle of view light beam 3, a principal light ray 4 at the maximum angle of view is indicated by a dashed and dotted line.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5, a sixth lens L6, and a seventh lens L7, provided in this order from the object side.

Figure 12:
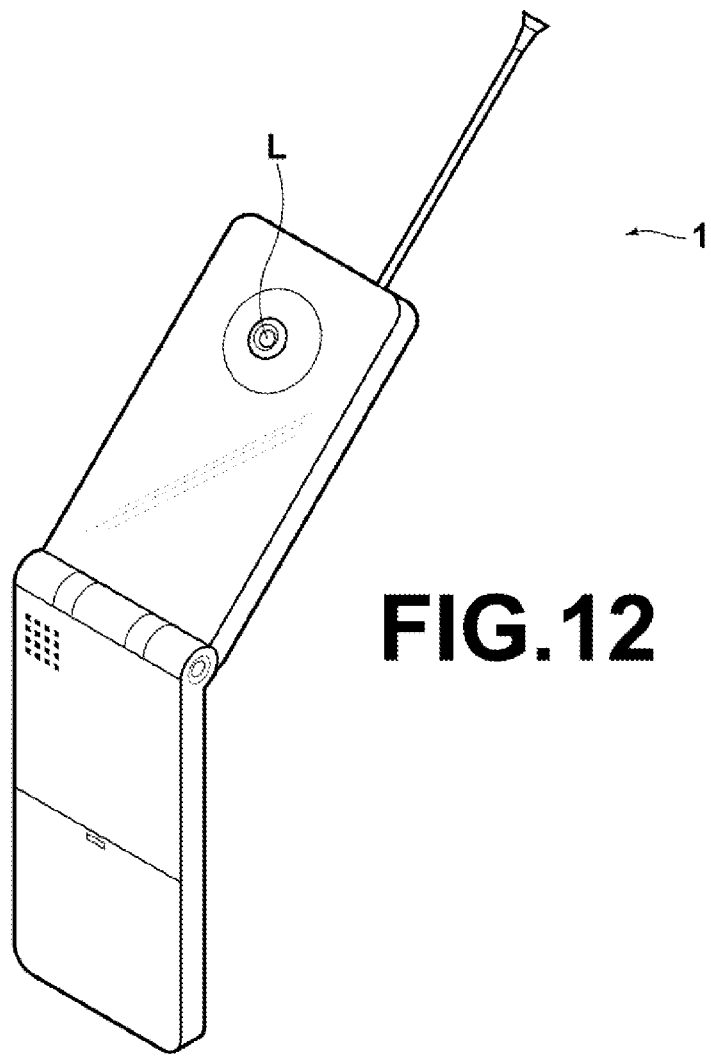
FIG. 12 is a diagram that illustrates a cellular telephone as an imaging apparatus equipped with the imaging lens of the present invention.

FIG. 12 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface R18 in FIG. 1 or imaging surfaces R17 in FIGS. 2 through 5) of the imaging lens L.

Figure 13:
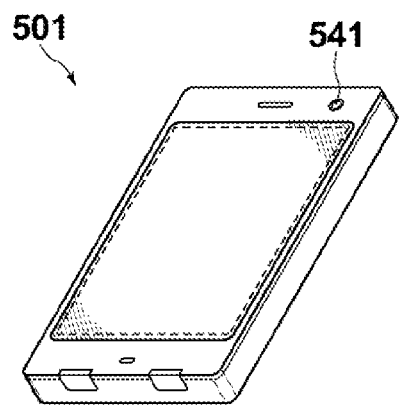
FIG. 13 is a diagram that illustrates a smart phone as an imaging apparatus equipped with the imaging lens of the present invention.

FIG. 13 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the seventh lens L7 and the imaging element 100, depending on the configuration of the camera to which the lens is applied. A planar optical member such as a cover glass for protecting an imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the seventh lens L7 to obtain the same effect as that of the optical member CG In this case, the number of parts can be reduced, and the total length can be shortened.

It is preferable for the imaging lens L to be equipped with an aperture stop St positioned at the object side of the surface of the third lens L3 toward the object side. In the case that the aperture stop St positioned in this manner, increases in the incident angles of light rays that pass through the optical system and enter the image formation plane (imaging element) can be suppressed, particularly at the peripheral portions of an imaging region. Note that the expression "positioned at the object side of the surface of the third lens L3 toward the object side" means that the position of the aperture stop in the direction of the optical axis is at the same position as the intersection of marginal axial rays of light and the surface of the third lens L3 toward the object side, or more toward the object side than this position. It is preferable for the aperture stop St to be positioned at the object side of the surface of the first lens L1 toward the object side, in order to cause the above advantageous effect to become more prominent. Note that the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position.

Alternatively, the aperture stop St may be provided between the first lens L1 and the second lens L2, or between the second lens L2 and the third lens L3. In these cases, aberrations can be corrected in a well balanced manner by the lens positioned toward the object side of the aperture stop St and the lens positioned toward the image side of the aperture stop, while shortening the total length. In the embodiments, the lens of Example 4 (FIG. 4) is an example of a configuration in which the aperture stop St is positioned at the object side of the surface of the first lens L1 toward the object side, and the lenses of Examples 1 through 3 and Example 5 (FIGS. 1 through 3 and 5) are examples of configurations in which the aperture stop St is provided between the second lens L2 and the third lens L3. In addition, the aperture stops St illustrated in the drawings do not necessarily represent the sizes or shapes thereof, but indicate the positions thereof on the optical axis Z1.

In the imaging lens L, the first lens L1 has a positive refractive power in the vicinity of the optical axis. For this reason, the configuration of the imaging lens L is advantageous from the viewpoint of realizing a shortening the total length of the lens. In addition, the first lens L1 has a convex surface toward the object side in the vicinity of the optical axis. In this case, the positive refractive power of the first lens L1, which performs a substantial portion of the image forming function, can be sufficiently increased. Therefore, shortening of the total length of the lens can be more favorably realized. In addition, it is preferable for the first lens L1 to be of a meniscus shape having a convex surface toward the object side in the vicinity of the optical axis. In this case, the rearward principal point of the first lens L1 can be moved toward the object side, and shortening of the total length can be more favorably realized.

At least one surface of the second lens L2 is of an aspherical shape. Therefore, spherical aberration can be favorably corrected. Either one of the surface of the second lens L2 toward the image side and the surface of the second lens L2 toward the object side may be of an aspherical shape in order to obtain this advantageous effect. However, it is more preferable for both of the surface toward the image side and the surface toward the object side to be of aspherical shapes.

In addition, the first lens L1 and the second lens L2 may be cemented together. In this case, longitudinal chromatic aberration can be favorably corrected. In addition, in the case that the first lens L1 and the second lens L2 are cemented together, shortening of the distance from the surface of the first lens L1 toward the object side to the surface of the second lens L2 toward the image side is facilitated more than a case in which the first lens L1 and the second lens L2 are single lenses. That is, such a configuration is advantageous from the viewpoint of shortening the total length of the lens. In addition, it is preferable for the joint surface between the first lens L1 and the second lens L2 to be of an aspherical shape in the case that the first lens L1 and the second lens L2 are cemented together. In this case, such a configuration is advantageous from the viewpoint of correcting differences in spherical aberration caused by differences in the wavelengths of light rays that pass through the first lens L1 and the second lens L2. Alternatively, the first lens L1 and the second lens L2 may be configured as single lenses. In this case, the number of lens surfaces will be greater than a case in which the first lens L1 and the second lens L2 form a cemented lens. Therefore, the degree of freedom in the design of each lens will increase. This is advantageous from the viewpoint of correcting various aberrations while shortening the total length.

In addition, it is preferable for the second lens L2 to have a negative refractive power in the vicinity of the optical axis. In this case, longitudinal chromatic aberration and spherical aberration can be favorably corrected. In addition, the second lens L2 may have a concave surface toward the image side in the vicinity of the optical axis. In this case, excessive correction of spherical aberration can be prevented. Further, the second lens L2 may be of a meniscus shape having a concave surface toward the image side in the vicinity of the optical axis. In this case, the aforementioned advantageous effect of preventing excessive correction of spherical aberration will become more prominent.

At least one surface of the third lens L3 is of an aspherical shape. Therefore, spherical aberration can be favorably corrected. Either one of the surface of the third lens L3 toward the image side and the surface of the third lens L3 toward the object side may be of an aspherical shape in order to obtain this advantageous effect. However, it is more preferable for both of the surface toward the image side and the surface toward the object side to be of aspherical shapes.

It is preferable for the third lens L3 to have a positive refractive power in the vicinity of the optical axis. In this case, spherical aberration can be favorably corrected. In addition, the third lens L3 may be of a meniscus shape having a convex surface toward the image side in the vicinity of the optical axis. In this case, such a configuration is advantageous from the viewpoint of suppressing the generation of astigmatism. Alternatively, the third lens may be of a biconvex shape in the vicinity of the optical axis. In this case, such a configuration is advantageous from the viewpoint of suppressing the generation of spherical aberration. Further, the third lens L3 may be of a meniscus shape having a concave surface toward the image side. In this case, such a configuration is advantageous from the viewpoint of shortening the total length of the lens.

At least one surface of the fourth lens L4 is of an aspherical shape. Therefore, spherical aberration can be favorably corrected. Either one of the surface of the fourth lens L4 toward the image side and the surface of the fourth lens L4 toward the object side may be of an aspherical shape in order to obtain this advantageous effect. However, it is more preferable for both of the surface toward the image side and the surface toward the object side to be of aspherical shapes.

It is preferable for the fourth lens L4 to have a negative refractive power in the vicinity of the optical axis. Thereby, lateral chromatic aberration can be favorably corrected. In addition, it is preferable for the fourth lens L4 to be of a biconcave shape in the vicinity of the optical axis. In this case, spherical aberration and longitudinal chromatic aberration can be favorably corrected.

The fifth lens L5 has a positive refractive power in the vicinity of the optical axis. Therefore, increases in the incident angles of light rays that pass through the imaging lens L and enter the image formation plane (imaging element) at the peripheral portions of the imaging region can be favorably suppressed. In addition, the fifth lens L5 is of a meniscus shape having a convex surface toward the image side in the vicinity of the optical axis. Therefore, the generation of astigmatism can be suppressed.

At least one surface of the sixth lens L6 is of an aspherical shape. Therefore, spherical aberration can be favorably corrected. Either one of the surface of the sixth lens L6 toward the image side and the surface of the sixth lens L6 toward the object side may be of an aspherical shape in order to obtain this advantageous effect. However, it is more preferable for both of the surface toward the image side and the surface toward the object side to be of aspherical shapes.

In addition, the sixth lens L6 may have a negative refractive power or a positive refractive power in the vicinity of the optical axis, as long as desired performance can be realized.

In the case that the sixth lens L6 has a positive refractive power in the vicinity of the optical axis, increases in the incident angles of light rays that pass through the imaging lens L and enter the image formation plane (imaging element) at the peripheral portions of the imaging region can be favorably suppressed. Alternatively, in the case that the sixth lens L6 has a negative refractive power in the vicinity of the optical axis, negative refractive power can be distributed between two lenses, that is, the sixth lens L6 and the seventh lens L7. As a result, an appropriate amount of negative refractive power can be secured at the image side of the imaging lens L, thereby enabling a shortening of the total length of the lens to be achieved while suppressing the generation of astigmatism. In addition, it is preferable for the sixth lens L6 to be of a meniscus shape in the vicinity of the optical axis. In the case that the sixth lens L6 is of a meniscus shape having a convex surface toward the image side in the vicinity of the optical axis, the generation of astigmatism can be suppressed.

The seventh lens L7 has a negative refractive power in the vicinity of the optical axis. Thereby, if the first lens L1 through the sixth lens L6 are considered to constitute a positive lens group and the seventh lens L7 is considered to constitute a negative lens group, the imaging lens L can be of a telephoto type configuration as a whole. As a result, the rearward principal point of the imaging lens L can be positioned toward the object side, and a shortening of the total length of the lens can be favorably realized. In addition, field curvature can be favorably corrected by the seventh lens L7 having a negative refractive power in the vicinity of the optical axis.

In addition, the seventh lens L7 has a concave surface toward the image side in the vicinity of the optical axis. Therefore, a shortening of the total length can be more favorably realized, while field curvature can be favorably corrected. In addition, it is preferable for the seventh lens L7 to be of a meniscus shape having a concave surface toward the image side in the vicinity of the optical axis. In this case, such a configuration is more advantageous from the viewpoint of realizing a shortening of the total length.

In addition, the surface of the seventh lens L7 toward the image side is of an aspherical shape having at least one inflection point within a range from an intersection of a principal light ray at a maximum angle of view with the surface toward the image side inwardly toward the optical axis in the radial direction. Thereby, increases in the incident angles of light rays that pass through the optical system and enter the image formation plane (imaging element) can be suppressed, particularly at the peripheral portions of the imaging region. In addition, distortion can be favorably corrected by the surface of the seventh lens L7 toward the image side being of an aspherical shape having at least one inflection point within a range from the intersection of a principal light ray at a maximum angle of view with the surface toward the image side inwardly toward the optical axis in the radial direction. Note that the "inflection point" on the surface of the seventh lens L7 toward the image side refers to a point at which the shape of the surface of the seventh lens L7 toward the image side changes from a convex shape to a concave shape (or from a concave shape to a convex shape) with respect to the image side. In addition, in the present specification, the expression "within a range from an intersection of a principal light ray at a maximum angle of view with the surface toward the image side inwardly toward the optical axis in the radial direction" refers to a position at the intersection of the surface toward the image side and the principal light ray at the maximum angle of view and positions along the radial direction toward the optical axis therefrom. The inflection point may be provided on the surface of the seventh lens L7 toward the image side at any arbitrary position from among the position at the intersection of the surface of the seventh lens L7 toward the image side and the principal light ray at the maximum angle of view and positions along the radial direction toward the optical axis therefrom.

In the case that the third lens L3 through the seventh lens L7 that constitute the imaging lens L are single lenses, the number of lens surfaces will be greater than that for a case in which some of the lenses among the third lens L3 through the seventh lens L7 are cemented lenses. Therefore, the degree of freedom in the design of each lens will increase. As a result, a shortening of the total length can be favorably realized. Note that any of the lenses among the third lens L3 through the seventh lens L7 may be a cemented lens. In this case, eccentricities between lenses can be suppressed.

According to the imaging lens L described above, the configurations of each of the first lens L1 through the seventh lens L7 are optimized as lens elements in a lens configuration having a total of seven lenses. Therefore, a lens system which is compatible with an increased number of pixels, achieves a shortened total length and a wide angle of view, and has high imaging performance from a central angle of view to peripheral angles of view, can be realized.

It is preferable for at least one of the surfaces of each of the first lens L1 through the seventh lens L7 of the imaging lens L to be an aspherical surface, in order to improve performance.

Next, the operation and effects of conditional formulae related to the imaging lens L configured as described above will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the focal length f7 of the seventh lens L7 and the focal length f of the entire system to satisfy Conditional Formula (1) below.

$$-1.25 < f/f7 < -0.5 \tag{1}$$

Conditional Formula (1) defines a preferable range of numerical values for the ratio of the focal length f of the entire system with respect to the focal length f7 of the seventh lens L7. It is preferable for the refractive power of the seventh lens L7 to be maintained such that the value of f/f7 is not less than or equal to the lower limit defined in Conditional Formula (1). In this case, the negative refractive power of the seventh lens L7 will not become excessively strong with respect to the refractive power of the entire system. As a result, increases in the incident angles of light rays that pass through the imaging lens L and enter the image formation plane (imaging element) at the peripheral portions of the imaging region can be favorably suppressed. In addition, by securing the refractive power of the seventh lens L7 such that the value of f/f7 is not greater than or equal to the upper limit defined in Conditional Formula (1), the negative refractive power of the seventh lens L7 will not become excessively weak with respect to the refractive power of the entire system. As a result, field curvature can be favorably corrected. It is preferable for Conditional Formula (1-1) to be satisfied, and more preferable for Conditional Formula (1-2) to be satisfied, in order to cause these advantageous effects to become more prominent.

$$-1.24 < f/f7 < -0.7 \tag{1-1}$$

$$-1.2 < f/f7 < -0.8 \tag{1-2}$$

In addition, it is preferable for the focal length f6 of the sixth lens L6 and the focal length f of the entire system to satisfy Conditional Formula (2) below.

$$-0.6 < f/f6 < 0.3 \tag{2}$$

Conditional Formula (2) defines a preferable range of numerical values for the ratio of the focal length f of the entire system with respect to the focal length f6 of the sixth lens L6. It is preferable for the refractive power of the sixth lens L6 to be maintained such that the value of f/f6 is not less than or equal to the lower limit defined in Conditional Formula (2). In this case, the negative refractive power of the sixth lens L6 will not become excessively strong with respect to the refractive power of the entire system. As a result, increases in the incident angles of light rays that pass through the imaging lens L and enter the image formation plane (imaging element) at the peripheral portions of the imaging region can be favorably suppressed. In addition, by setting the refractive power of the sixth lens L6 such that the value of f/f6 is not greater than or equal to the upper limit defined in Conditional Formula (2), lateral chromatic aberration and field curvature can be corrected. It is preferable for Conditional Formula (2-1) to be satisfied, and more preferable for Conditional Formula (2-2) to be satisfied, in order to cause these advantageous effects to become more prominent.

$$-0.45 < f/f6 < 0.15 \tag{2-1}$$

$$-0.3 < f/f6 < 0.1 \tag{2-2}$$

In addition, it is preferable for the focal length f3 of the third lens L3 and the focal length f of the entire system to satisfy Conditional Formula (3) below.

$$0 < f/f3 < 0.35 \tag{3}$$

Conditional Formula (3) defines a preferable range of numerical values for the ratio of the focal length f of the entire system with respect to the focal length f3 of the third lens L3. By securing the refractive power of the third lens L3 such that the value of f/f3 is not less than or equal to the lower limit defined in Conditional Formula (3), the positive refractive power of the third lens L3 will not become excessively weak with respect to the refractive power of the entire system. As a result, various aberrations can be favorably corrected. This configuration is also advantageous from the viewpoint of shortening the total length while maintaining a small F number. By suppressing the refractive power of the third lens L3 such that the value of f/f3 is not greater than or equal to the upper limit defined in Conditional Formula (3), the positive refractive power of the fifth lens L5 will not become excessively strong with respect to the refractive power of the entire system. As a result, lateral chromatic aberration can be favorably corrected.

In addition, it is preferable for the focal length f of the entire system, the half value ω of the maximum angle of view in a state focused on an object at infinity, and the paraxial radius of curvature L7r of the surface of the seventh lens L7 toward the image side to satisfy Conditional Formula (4) below.

$$0.5 < f \cdot \tan \omega / L7r < 10 \tag{4}$$

Conditional Formula (4) defines a preferable range of numerical values for the ratio of the paraxial image height (f·tan ω) with respect to the paraxial radius of curvature L7r of the surface of the seventh lens L7 toward the image side. By setting the image height (f·tan ω) with respect to the paraxial radius of curvature L7r of the surface of the seventh lens L7 toward the image side such that the value of f·tan ω/L7r is not less than or equal to the lower limit defined in Conditional Formula (4), the absolute value of the paraxial radius of curvature L7r of the surface of the seventh lens L7 toward the image side, which is the surface most toward the image side in the imaging lens, will not become excessively great. As a result, a shortening of the total length of the lens can be realized, while field curvature can be sufficiently corrected. Note that if the seventh lens L7 has a concave surface toward the image side and is of an aspherical shape having at least one inflection point as shown in the imaging lenses L of each of the Examples and the lower limit of Conditional Formula (4) is satisfied, field curvature can be favorably corrected from a central angle of view to peripheral angles of view. This configuration is favorable from the viewpoint of realizing a wider angle of view. By setting the image height (f·tan ω) with respect to the paraxial radius of curvature L7r of the surface of the seventh lens L7 toward the image side such that the value of f·tan ω/L7r is not greater than or equal to the upper limit defined in Conditional Formula (4), the absolute value of the paraxial radius of curvature L7r of the surface of the seventh lens L7 toward the image side, which is the surface most toward the image side in the imaging lens, will not become excessively small. This will result in increases in the incident angles of light rays that pass through the optical system and enter the image formation plane (imaging element) being suppressed, particularly at intermediate angles of view. In addition, excessive correction of field curvature can be suppressed. It is more preferable for Conditional Formula (4-1) to be satisfied, in order to cause these advantageous effects to become more prominent.

$$1.5 < f \cdot \tan \omega / L7r < 5 \quad (4\text{-}1)$$

In addition, it is preferable for the paraxial radius of curvature L7f of the surface of the seventh lens L7 toward the object side and the paraxial radius of curvature L7r of the surface of the seventh lens L7 toward the image side to satisfy Conditional Formula (5) below.

$$0.15 < (L7f - L7r)/(L7f + L7r) < 0.55 \quad (5)$$

Conditional Formula (5) defines preferred ranges of numerical values for the paraxial radius of curvature L7f of the surface of the seventh lens L7 toward the object side and the paraxial radius of curvature L7r of the surface of the seventh lens L7 toward the image side. Configuring the imaging lens such that the value of (L7f−L7r)/(L7f+L7r) is not less than or equal to the lower limit defined in Conditional Formula (5) is advantageous from the viewpoint of correcting astigmatism. Configuring the imaging lens such that the value of (L7f−L7r)/(L7f+L7r) is not greater than or equal to the upper limit defined in Conditional Formula (5) is advantageous from the viewpoint of shortening the total length. It is more preferable for Conditional Formula (5-1) below to be satisfied, in order to cause these advantageous effects to become more prominent.

$$0.3 < (L7f - L7r)/(L7f + L7r) < 0.55 \quad (5\text{-}1)$$

As described above, in the imaging lens L according to the embodiment of the present invention, the configuration of each lens element is optimized within a lens configuration having seven lenses as a whole, and all of the lenses are single lenses. Therefore, a lens system that can achieve a shortening of the total length and a widening of the angle of view, and that realizes high imaging performance from a central angle of view to peripheral angles of view can be realized.

In addition, in the case that the lens configurations of each of the first lens L1 through the seventh lens L7 are set such that the maximum angle of view in a state focused on an object at infinity is 75 degrees or greater as in the imaging lenses of Examples 1 through 5, the imaging lens L can be favorably applied for use in imaging apparatuses such as cellular telephones. That is the imaging lenses of Examples 1 through 5 can satisfy the requirements regarding shortened total lengths and widened angles of view, and can meet demand to obtain a desired portion of an image from within a image photographed at a wide angle of view and high resolution by imaging apparatuses such as a cellular telephone terminal, by enlarging the desired portion. In contrast, the imaging lens disclosed in Japanese Unexamined Patent Publication No. 2012-155223 has a narrow maximum angle of view of 66 degrees, and it is difficult for this lens to sufficiently satisfy demand for wider angles of view in imaging apparatuses such as a cellular telephone terminal.

Further improved imaging performance can be realized by satisfying preferred conditions as appropriate. In addition, the imaging apparatuses according to the embodiments of the present invention output image signals corresponding to optical images formed by the high performance imaging lenses according to the embodiments of the present invention. Therefore, photographed images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with surface of an optical element most toward the object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface Si and an i+1 st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column νdj.

Table 1 also shows the aperture stop St and the optical member CG In Table 1, a surface number and the text "(St)" are shown in the row of the surface number that corresponds to the aperture stop St, and a surface number and the text "(IMG)" are shown in the surface number corresponding to the imaging surface. The signs of the radii of curvature are positive for surface shapes having convex surfaces toward the object side, and negative for surface shapes having convex surfaces toward the image side. In addition, the values of the focal length f (mm) of the entire system, the back focus Bf (mm), the F number Fno., and the maximum angle of view 2ω (°) are shown as data above the lens data. Note that the back focus Bf is represented as an air converted value.

In the imaging lens of Example 1, both of the surfaces of the first lens L1 through the seventh lens L7 are all aspherical surfaces. The radii of curvature in the vicinity of the optical axis (paraxial radii of curvature) are shown as the radii of curvature of these aspherical surfaces in the basic lens data of Table 1.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$"

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - KA \times C^2 \times h^2}} + \sum_n An \times h^n \quad (A)$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 5 are shown in Table 3 through Table 10 as Example 2 through Example 5. In the imaging lenses of Examples 1 through 4, both of the surfaces of the first lens L1 through the seventh lens L7 are all aspherical surfaces. In the imaging lens of Example 5, the surfaces of the first lens L1 through the seventh lens L7 are all aspherical surfaces other than the joint surface between the first lens L1 and the second lens L2.

Figure 7:
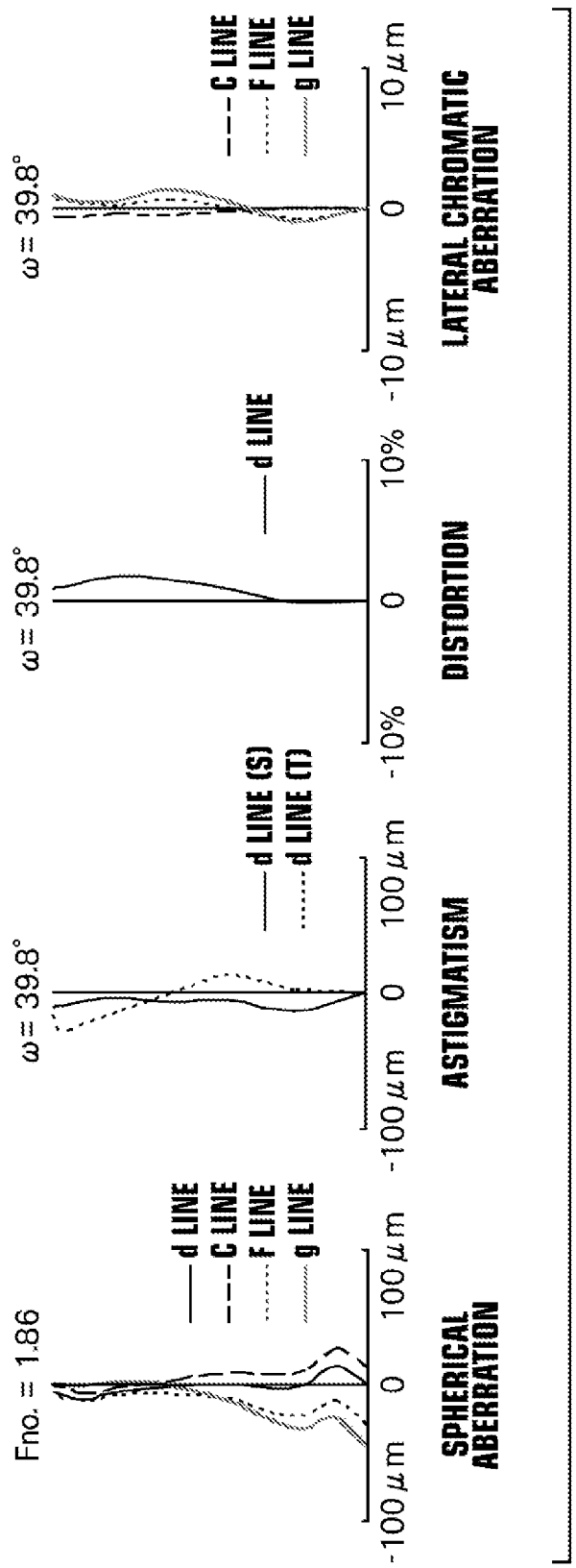
FIG. 7 is a collection of diagrams that illustrate aberrations of the imaging lens of Example 1, wherein the diagrams illustrate spherical aberration, astigmatism, distortion, and lateral chromatic aberration, in this order from the left side of the drawing sheet.
Figure 8:
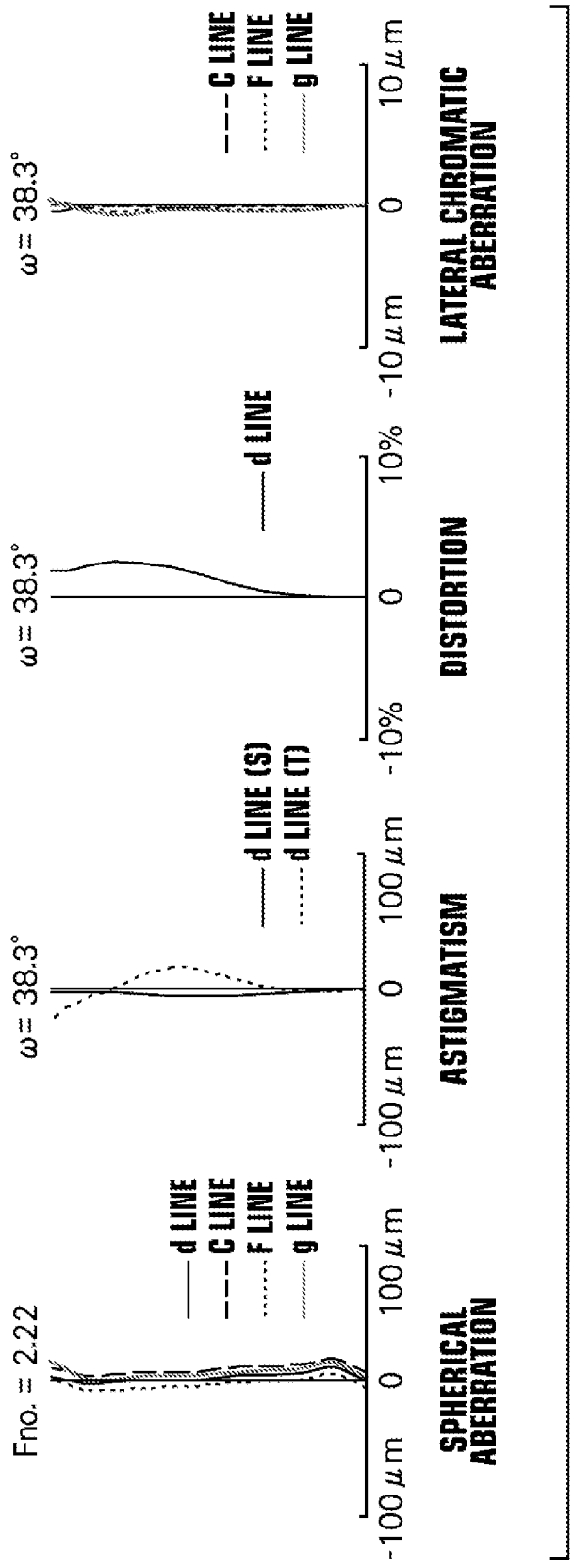
FIG. 8 is a collection of diagrams that illustrate aberrations of the imaging lens of Example 2, wherein the diagrams illustrate spherical aberration, astigmatism, distortion, and lateral chromatic aberration, in this order from the left side of the drawing sheet.
Figure 9:
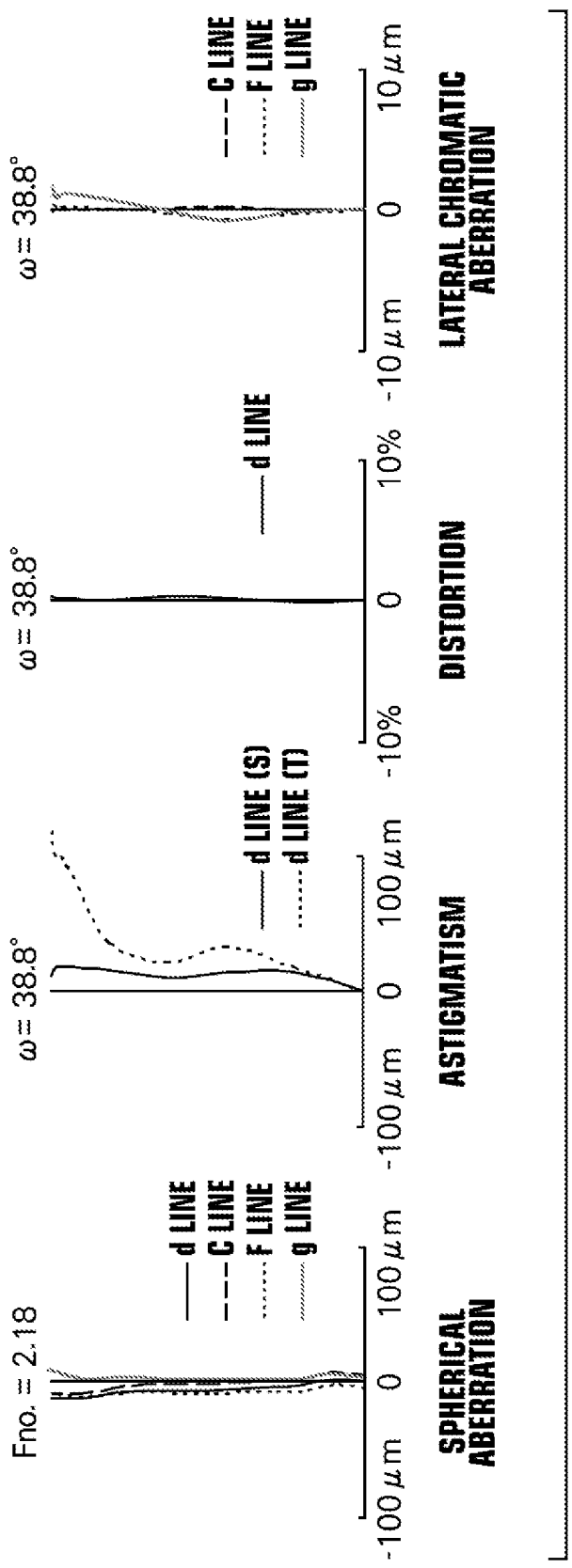
FIG. 9 is a collection of diagrams that illustrate aberrations of the imaging lens of Example 3, wherein the diagrams illustrate spherical aberration, astigmatism, distortion, and lateral chromatic aberration, in this order from the left side of the drawing sheet.
Figure 10:
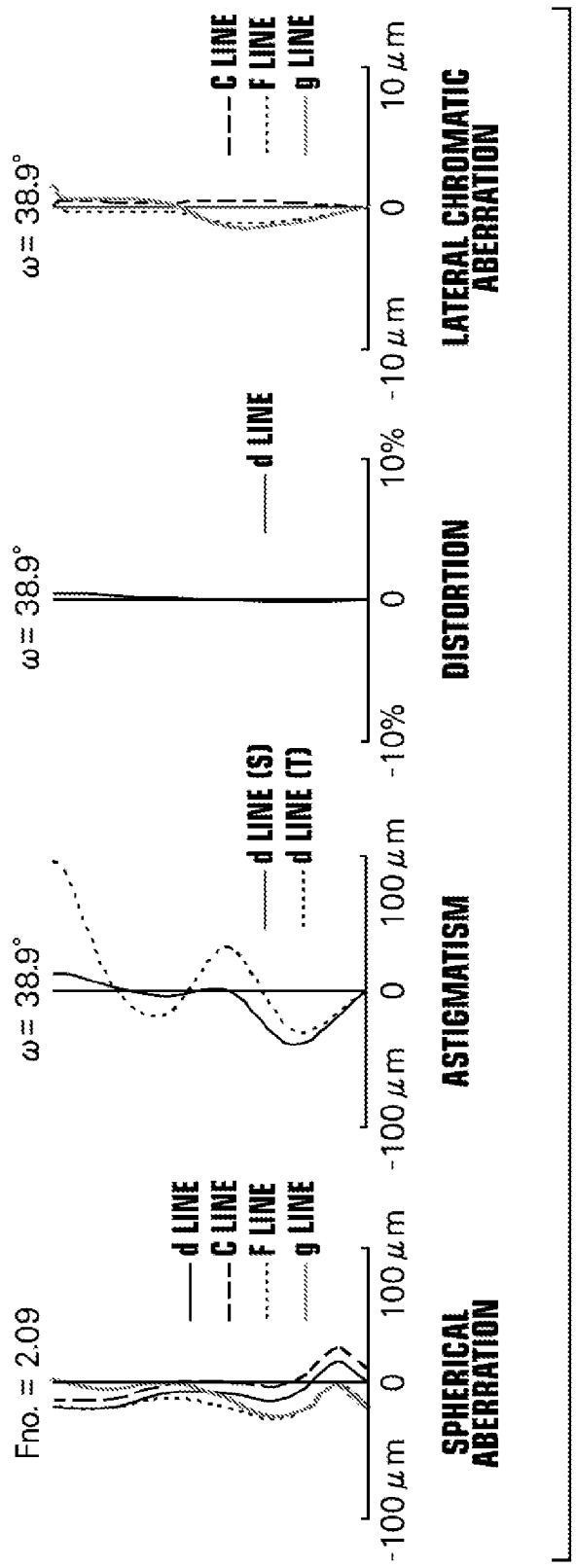
FIG. 10 is a collection of diagrams that illustrate aberrations of the imaging lens of Example 4, wherein the diagrams illustrate spherical aberration, astigmatism, distortion, and lateral chromatic aberration, in this order from the left side of the drawing sheet.
Figure 11:
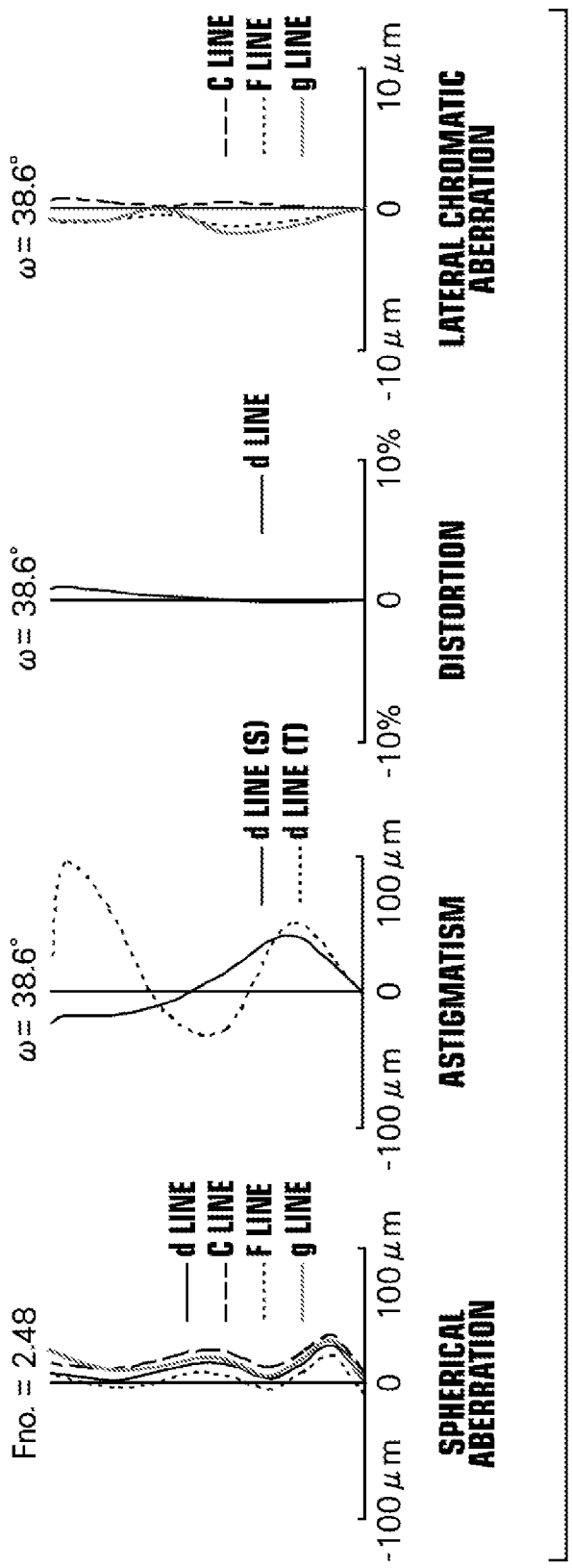
FIG. 11 is a collection of diagrams that illustrate aberrations of the imaging lens of Example 5, wherein the diagrams illustrate spherical aberration, astigmatism, distortion, and lateral chromatic aberration, in this order from the left side of the drawing sheet.

FIG. 7 is a collection of diagrams that illustrate aberrations of the imaging lens of Example 1, wherein the diagrams illustrate the spherical aberration, the astigmatism (field curvature), the distortion and the lateral chromatic aberration (chromatic aberration of magnification) of the imaging lens of Example 1, respectively, in this order from the left side of the drawing sheet. Each of the diagrams that illustrate the spherical aberration, the astigmatism (field curvature), and the distortion illustrate aberrations using the d line (wavelength: 587.6 nm) as a reference wavelength. The diagram that illustrates spherical aberration also shows aberrations related to the F line (wavelength: 486.1 nm), the C line (wavelength: 656.3 nm), and the g line (wavelength: 435.8 nm). The diagram that illustrates lateral chromatic aberration shows aberrations related to the F line, the C line, and the g line. In the diagram that illustrates astigmatism, aberration in the sagittal direction (S) is indicated by a solid line, while aberration in the tangential direction (T) is indicated by a broken line. In addition, "Fno." denotes F numbers, and "ω" denotes a half value of the maximum angle of view in a state focused on an object at infinity.

Similarly, the aberrations of the imaging lens of Example 2 through Example 5 are illustrated in FIG. 8 through FIG. 11. The diagrams that illustrate aberrations in FIG. 8 through FIG. 11 are for those in which the object distance is infinity.

Table 11 shows values corresponding to Conditional Formulae (1) through (5), respectively summarized for each of Examples 1 through 5.

As can be understood from each set of numerical value data and from the diagrams that illustrate aberrations, each of the Examples favorably correct distortion, realize a widened angle of view, and realize high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 6.359, Bf = 1.211, Fno. = 1.86, 2ω = 79.6

| Si | Ri | Di | Ndj | vdj |
|---|---|---|---|---|
| *1 | 3.37843 | 0.974 | 1.68930 | 53.08 |
| *2 | 10.38887 | 0.100 | | |
| *3 | 7.40842 | 0.550 | 1.99754 | 20.51 |
| *4 | 5.15620 | 0.241 | | |
| 5 (St) | ∞ | 0.218 | | |
| *6 | -119.67071 | 0.666 | 1.54492 | 55.89 |
| *7 | -9.66005 | 0.318 | | |
| *8 | -19.93043 | 0.550 | 1.63351 | 23.63 |
| *9 | 88.19030 | 0.570 | | |
| *10 | -24.41185 | 1.480 | 1.68930 | 53.08 |
| *11 | -4.22425 | 0.150 | | |
| *12 | 6.40710 | 0.550 | 1.63351 | 23.63 |
| *13 | 6.60872 | 0.464 | | |
| *14 | 5.29661 | 0.550 | 1.54492 | 55.89 |
| *15 | 1.83386 | 0.612 | | |
| 16 | ∞ | 0.250 | 1.51633 | 64.14 |
| 17 | ∞ | 0.434 | | |
| 18 (IMG) | ∞ | | | |

*aspherical surface

TABLE 2

Example 1: Aspherical Surface Data

| Surface Number | KA | A3 | A4 | A5 | A6 |
|---|---|---|---|---|---|
| 1 | -8.1947883E+00 | -2.2427356E-03 | 4.4672775E-02 | -3.4704029E-02 | 3.8106029E-02 |
| 2 | 1.2279520E+01 | 1.4785080E-03 | -3.3170208E-02 | 5.3249717E-02 | -8.1366533E-02 |
| 3 | -7.0076684E+00 | -1.9989294E-03 | -1.9407573E-02 | 2.1147452E-02 | -5.1936060E-02 |
| 4 | 1.6440082E-01 | 9.9647505E-03 | -6.7201738E-02 | 1.6006082E-01 | -2.6746398E-01 |
| 6 | 5.0000000E+01 | 2.2638840E-03 | -2.7493826E-02 | 2.4652301E-02 | -3.3342418E-02 |
| 7 | 1.1230699E+01 | -2.0581695E-02 | 7.8113526E-02 | -2.9434141E-01 | 4.7296770E-01 |
| 8 | 4.8214594E+01 | -8.1462797E-03 | -1.8789501E-02 | -6.1063446E-02 | 6.7675420E-02 |
| 9 | 4.9592219E+01 | -9.6301251E-03 | -4.5128702E-04 | -6.2049224E-02 | 7.4900940E-02 |
| 10 | 1.8602085E+00 | 1.8463619E-03 | -8.5572486E-03 | 6.6256332E-03 | -3.7325944E-03 |

TABLE 2-continued

Example 1: Aspherical Surface Data

| | | | | | |
|---|---|---|---|---|---|
| 11 | 1.0000000E+00 | −4.1031768E−02 | 1.1737670E−02 | 9.5963986E−03 | −7.7948595E−04 |
| 12 | 1.0000000E+00 | −6.5358663E−02 | 1.3332689E−02 | 7.4537731E−03 | −4.7686608E−03 |
| 13 | −3.2633675E+00 | −4.0583716E−02 | 3.2979027E−02 | −1.6376913E−02 | 3.6968272E−04 |
| 14 | 2.0629331E−01 | −2.3610091E−02 | −1.0179245E−01 | 5.2560728E−02 | −4.1601879E−03 |
| 15 | −3.5609660E+00 | −2.2032732E−02 | −4.5985636E−02 | 3.0486288E−02 | −5.8087123E−03 |

| | A7 | A8 | A9 | A10 |
|---|---|---|---|---|
| 1 | −3.6077248E−02 | 2.0186720E−02 | −5.7497380E−03 | 6.4574958E−04 |
| 2 | 8.7714987E−02 | −5.1857850E−02 | 1.5103462E−02 | −1.6809356E−03 |
| 3 | 8.1432071E−02 | −5.8772858E−02 | 1.9776083E−02 | −2.4817159E−03 |
| 4 | 2.7683216E−01 | −1.6482125E−01 | 5.1328667E−02 | −6.2898213E−03 |
| 6 | 2.4234405E−02 | −1.1451437E−02 | 2.9725585E−03 | −5.4017740E−04 |
| 7 | −4.5196095E−01 | 2.5383361E−01 | −7.7618079E−02 | 9.8866261E−03 |
| 8 | −3.1561071E−02 | 2.9877963E−03 | 1.8071299E−03 | −8.8126688E−05 |
| 9 | −5.3486651E−02 | 2.5636109E−02 | −7.7661846E−03 | 1.1684454E−03 |
| 10 | 2.0319589E−03 | −1.4174591E−03 | 4.6487549E−04 | −4.6762325E−05 |
| 11 | −2.4262314E−03 | 4.4818201E−04 | 1.6104178E−04 | −3.7843399E−05 |
| 12 | −1.1576897E−03 | 5.3019093E−04 | 4.0428220E−05 | −1.6005301E−05 |
| 13 | 8.6086668E−04 | −6.2359374E−05 | −1.7588117E−05 | 1.9525364E−06 |
| 14 | −2.9741431E−03 | 8.8061227E−04 | −9.0745660E−05 | 3.0337681E−06 |
| 15 | −7.3158039E−04 | 5.1595252E−04 | −9.0244688E−05 | 5.7343267E−06 |

TABLE 3

Example 2
f = 7.949, Bf = 1.574, Fno. = 2.22, 2ω = 76.6

| Si | Ri | Di | Ndj | vdj |
|---|---|---|---|---|
| *1 | 3.96655 | 1.198 | 1.68930 | 53.08 |
| *2 | 91.64226 | 0.719 | 1.99754 | 20.51 |
| *3 | 15.28224 | 0.195 | | |
| 4 (St) | ∞ | 0.216 | | |
| *5 | 43.41662 | 0.707 | 1.54492 | 55.89 |
| *6 | −32.58386 | 0.612 | | |
| *7 | −22.91356 | 0.602 | 1.63351 | 23.63 |
| *8 | 95.22628 | 0.225 | | |
| *9 | −7.71925 | 1.666 | 1.68930 | 53.08 |
| *10 | −4.10945 | 0.150 | | |
| *11 | −9.59269 | 0.680 | 1.63351 | 23.63 |
| *12 | −18.62129 | 0.172 | | |
| *13 | 7.69711 | 1.563 | 1.54492 | 55.89 |
| *14 | 2.84620 | 0.900 | | |
| 15 | ∞ | 0.250 | 1.51633 | 64.14 |
| 16 | ∞ | 0.509 | | |
| 17 (IMG) | ∞ | | | |

*aspherical surface

TABLE 4

Example 2: Aspherical Surface Data

| Surface Number | KA | A3 | A4 | A5 | A6 |
|---|---|---|---|---|---|
| 1 | −6.8417535E+00 | −2.8260549E−03 | 2.4730392E−02 | −1.7726625E−02 | 1.5894248E−02 |
| 2 | −3.7316585E+01 | 5.1223562E−03 | −2.0276270E−02 | 3.6913183E−02 | −4.3246542E−02 |
| 3 | −4.9996497E−02 | 4.1810840E−03 | −2.4787977E−02 | 5.9355175E−02 | −9.4032119E−02 |
| 5 | −4.8056575E+01 | 2.5429358E−03 | −1.5648018E−02 | 2.4189087E−02 | −2.6505807E−02 |
| 6 | −2.7043289E+01 | −9.1025475E−03 | 3.3377191E−02 | −1.0463843E−01 | 1.5608548E−01 |
| 7 | −4.8660736E+01 | −5.5346793E−03 | −1.2831295E−02 | −2.7252769E−02 | 2.1465411E−02 |
| 8 | −4.6091381E+01 | −4.8072834E−04 | −3.1214218E−02 | −3.6762042E−03 | 1.8591305E−02 |
| 9 | −1.8227285E+01 | 2.3772796E−03 | −3.4700632E−02 | 1.5668053E−02 | −2.4528440E−03 |
| 10 | 1.0000000E+00 | −1.0167386E−02 | −1.2476876E−02 | 1.0001428E−02 | 1.5549250E−04 |
| 11 | 1.0000000E+00 | −2.2769330E−02 | 3.7789577E−02 | −1.2513459E−02 | −1.9442966E−03 |
| 12 | −2.3890684E+01 | −1.1018698E−02 | 2.8377439E−02 | −1.0478673E−02 | −4.2454129E−03 |
| 13 | −1.0682938E+00 | 1.1230516E−02 | −6.7937845E−02 | 2.6818848E−02 | −1.6062661E−03 |
| 14 | −5.8491234E+00 | 1.3236962E−02 | −3.2552051E−02 | 1.3705810E−02 | −2.0385504E−03 |

| | A7 | A8 | A9 | A10 |
|---|---|---|---|---|
| 1 | −1.2163585E−02 | 5.6447891E−03 | −1.4173181E−03 | 1.4812086E−04 |
| 2 | 3.0325509E−02 | −1.2112691E−02 | 2.3925889E−03 | −1.5870567E−04 |
| 3 | 8.8781576E−02 | −4.9250300E−02 | 1.4711393E−02 | −1.7968748E−03 |
| 5 | 1.4559488E−02 | −1.3513401E−03 | −1.8042096E−03 | 6.0431335E−04 |
| 6 | −1.4133084E−01 | 7.6264177E−02 | −2.2424896E−02 | 2.7157158E−03 |
| 7 | −4.1987395E−03 | −6.2570609E−03 | 3.8081197E−03 | −6.7232728E−04 |
| 8 | −1.7738283E−02 | 8.3174617E−03 | −2.0809550E−03 | 2.9215179E−04 |
| 9 | −1.3895144E−07 | −5.9313587E−04 | 5.8862783E−04 | −1.3811066E−04 |
| 10 | −1.3340342E−03 | 2.1559290E−04 | 3.5474071E−05 | −7.1520440E−06 |

TABLE 4-continued

Example 2: Aspherical Surface Data

| | | | | |
|---|---|---|---|---|
| 11 | 1.1437813E−03 | −1.1482563E−05 | −1.3549362E−04 | 2.9710841E−05 |
| 12 | 3.5563182E−04 | 1.2764248E−05 | 2.8106295E−06 | −1.8296876E−06 |
| 13 | −1.0361138E−03 | 2.4952241E−04 | −2.1947651E−05 | 6.9223454E−07 |
| 14 | −2.4382594E−04 | 1.3983800E−04 | −2.0641470E−05 | 1.1030325E−06 |

TABLE 5

Example 3
f = 7.849, Bf = 1.488, Fno. = 2.18, 2ω = 77.6

| Si | Ri | Di | Ndj | vdj |
|---|---|---|---|---|
| *1 | 3.97000 | 1.060 | 1.68930 | 53.08 |
| *2 | 15.41312 | 0.719 | 1.99754 | 20.51 |
| *3 | 8.70817 | 0.192 | | |
| 4 (St) | ∞ | 0.165 | | |
| *5 | 13.52495 | 0.602 | 1.54492 | 55.89 |
| *6 | 64.35458 | 0.832 | | |
| *7 | −43.73130 | 0.601 | 1.64170 | 22.45 |
| *8 | 17.99866 | 0.150 | | |
| *9 | −15.08505 | 1.631 | 1.54492 | 55.89 |
| *10 | −3.31220 | 0.150 | | |
| *11 | 81.89429 | 1.173 | 1.64170 | 22.45 |
| *12 | 15.30137 | 0.384 | | |
| *13 | 6.40945 | 1.126 | 1.53409 | 55.87 |
| *14 | 2.44877 | 0.900 | | |
| 15 | ∞ | 0.250 | 1.51633 | 64.14 |
| 16 | ∞ | 0.423 | | |
| 17 (IMG) | ∞ | | | |

*aspherical surface

TABLE 6

Example 3: Aspherical Surface Data

| Surface Number | KA | A3 | A4 | A5 | A6 |
|---|---|---|---|---|---|
| 1 | −6.3327610E+00 | −3.5000089E−03 | 2.5257102E−02 | −1.8495396E−02 | 1.7083621E−02 |
| 2 | 7.1306346E+00 | 1.6036162E−03 | −1.8490699E−02 | 3.5786255E−02 | −4.2781526E−02 |
| 3 | 1.9225365E+00 | 1.8214005E−03 | −2.2339093E−02 | 5.9869785E−02 | −9.7009678E−02 |
| 5 | −8.4848927E+00 | 5.8820980E−03 | −2.9118947E−02 | 3.7349522E−02 | −3.9048829E−02 |
| 6 | 4.9999997E+01 | −7.4879784E−03 | 2.9056529E−02 | −1.0505924E−01 | 1.5850250E−01 |
| 7 | 3.7015616E+01 | −1.5899544E−02 | 9.9110363E−03 | −4.5544596E−02 | 2.5378269E−02 |
| 8 | 4.3017219E+01 | −1.5249171E−02 | −1.7763269E−02 | −7.7587600E−03 | 1.7441948E−02 |
| 9 | −7.3589219E+00 | −3.1240215E−04 | −3.3288637E−02 | 2.0672444E−02 | −1.9890402E−03 |
| 10 | 8.0530678E−02 | −2.3824914E−03 | −1.5715162E−02 | 1.1581208E−02 | −9.7586174E−04 |
| 11 | −4.3291404E+01 | −9.1849524E−03 | 1.8841957E−03 | 2.6819618E−03 | −3.0622130E−03 |
| 12 | −3.8606341E+01 | −1.1137626E−02 | 4.3465699E−03 | −7.9875711E−04 | −4.1675321E−04 |
| 13 | −1.1796329E+00 | −3.4083948E−03 | −6.8035074E−02 | 2.8265472E−02 | −1.6674185E−03 |
| 14 | −4.7804443E+00 | 8.1139290E−04 | −3.0233462E−02 | 1.4040408E−02 | −1.9445872E−03 |

| | A7 | A8 | A9 | A10 |
|---|---|---|---|---|
| 1 | −1.2460070E−02 | 5.3813623E−03 | −1.2242740E−03 | 1.1480276E−04 |
| 2 | 3.0212287E−02 | −1.1894055E−02 | 2.2447885E−03 | −1.2849573E−04 |
| 3 | 9.0484536E−02 | −4.8260808E−02 | 1.3482846E−02 | −1.4861247E−03 |
| 5 | 1.8951961E−02 | 8.2243190E−04 | −4.5418865E−03 | 1.2927061E−03 |
| 6 | −1.4294410E−01 | 7.5618380E−02 | −2.1756024E−02 | 2.5984816E−03 |
| 7 | 1.5282475E−03 | −1.0370494E−02 | 4.6922932E−03 | −6.9219050E−04 |
| 8 | −1.5514577E−02 | 8.1312086E−03 | −2.5849430E−03 | 3.8284686E−04 |
| 9 | 4.3826529E−04 | −1.9068016E−03 | 8.8524231E−04 | −1.2073408E−04 |
| 10 | −1.1707385E−03 | 1.1488482E−04 | 1.2969670E−04 | −2.5473969E−05 |
| 11 | 6.4258304E−04 | 2.3569320E−05 | −7.1772198E−05 | 1.4984514E−05 |
| 12 | 4.6675635E−05 | −1.4794318E−05 | 1.1474217E−05 | −1.4603824E−06 |
| 13 | −1.0830565E−03 | 2.5014968E−04 | −2.0413970E−05 | 5.4999935E−07 |
| 14 | −3.2112076E−04 | 1.4329854E−04 | −1.7787356E−05 | 7.7314284E−07 |

TABLE 7

Example 4
f = 8.922, Bf = 1.958, Fno. = 2.09, 2ω = 77.8

| Si | Ri | Di | Ndj | vdj |
|---|---|---|---|---|
| 1 (St) | ∞ | −0.500 | | |
| *2 | 4.27487 | 0.968 | 1.68930 | 53.08 |
| *3 | 14.03995 | 0.826 | 1.99754 | 20.51 |
| *4 | 9.32218 | 0.428 | | |
| *5 | 23.44935 | 0.689 | 1.54492 | 55.89 |
| *6 | 239.77362 | 0.989 | | |
| *7 | −28.48309 | 0.798 | 1.64170 | 22.45 |
| *8 | 20.30222 | 0.208 | | |
| *9 | −10.36002 | 2.050 | 1.54492 | 55.89 |
| *10 | −3.13158 | 0.172 | | |

TABLE 7-continued

Example 4
f = 8.922, Bf = 1.958, Fno. = 2.09, 2ω = 77.8

| Si | Ri | Di | Ndj | vdj |
|---|---|---|---|---|
| *11 | 38.16957 | 1.066 | 1.64170 | 22.45 |
| *12 | 18.32360 | 0.390 | | |
| *13 | 6.96507 | 1.259 | 1.53409 | 55.87 |
| *14 | 2.66696 | 1.034 | | |
| 15 | ∞ | 0.287 | 1.51633 | 64.14 |
| 16 | ∞ | 0.734 | | |
| 17 (IMG) | ∞ | | | |

*aspherical surface

TABLE 8

Example 4: Aspherical Surface Data

| Surface Number | KA | A3 | A4 | A5 | A6 |
|---|---|---|---|---|---|
| 2 | −6.2846162E+00 | 1.8523217E−15 | −9.8223173E−03 | 9.6283915E−02 | −1.9508795E−01 |
| 3 | 1.13G4846E+01 | 5.9126172E−17 | 2.2295202E−04 | −2.0245203E−02 | 4.7530790E−02 |
| 4 | 2.2604682E+00 | −4.8463335E−16 | 2.6545378E−03 | −4.1925361E−02 | 1.3867167E−01 |
| 5 | −6.5179853E+00 | −2.4763759E−16 | 3.0380146E−02 | −2.0487104E−01 | 5.1618399E−01 |
| 6 | −4.9984539E+01 | 1.5184248E−15 | −4.2594944E−02 | 1.7122923E−01 | 4.0539611E−01 |
| 7 | 4.9947400E+01 | 1.7356458E−15 | −1.0648036E−01 | 4.2066296E−01 | −9.6599227E−01 |
| 8 | 3.5988756E+01 | 7.1471870E−16 | −9.7134577E−02 | 2.8810678E−01 | −5.0900516E−01 |
| 9 | −1.0211635E+01 | 4.7990677E−18 | −2.3634247E−02 | 1.9073388E−02 | −1.0343798E−02 |
| 10 | 6.4444137E−02 | 2.2686202E−16 | −1.9127964E−02 | 2.4544863E−02 | −2.2310838E−02 |
| 11 | −4.9534930E+01 | 3.7247140E−15 | −2.7549274E−02 | 6.9937551E−02 | −8.3441924E−02 |
| 12 | −1.9909876E+01 | 2.2215101E−15 | −2.4958412E−02 | 5.6158853E−02 | −5.5692168E−02 |
| 13 | −1.2880289E+00 | −3.6540148E−16 | −5.3480604E−02 | 2.9040984E−02 | −1.0504257E−02 |
| 14 | −4.6181039E+00 | −1.0255197E−16 | −2.0830585E−02 | 6.6636815E−03 | 8.8621124E−04 |

| | A7 | A8 | A9 | A10 | A11 |
|---|---|---|---|---|---|
| 2 | 2.1397570E−01 | −1.2467000E−01 | 1.8558459E−02 | 2.3597149E−02 | −1.6148572E−02 |
| 3 | −6.2085245E−02 | 4.6672466E−02 | −1.5919685E−02 | −2.7176192E−03 | 4.6247519E−03 |
| 4 | −2.4078356E−01 | 2.3148955E−01 | −1.0181124E−01 | −1.6883477E−02 | 4.2143526E−02 |
| 5 | −7.3177723E−01 | 5.7700743E−01 | −1.6972719E−01 | −1.0761481E−01 | 1.2045365E−01 |
| 6 | 5.3936221E−01 | −4.0267312E−01 | 1.2240345E−01 | 4.8947205E−02 | −5.8380207E−02 |
| 7 | 1.2513261E+00 | −9.2403711E−01 | 3.0922237E−01 | 5.7672990E−02 | −9.6049119E−02 |
| 8 | 5.2082466E−01 | −2.9903251E−01 | 6.7824004E−02 | 2.4043068E−02 | −2.1113827E−02 |
| 9 | 8.3181549E−03 | −5.2344596E−03 | 1.2292905E−03 | 4.3629415E−04 | −3.5128636E−04 |
| 10 | 1.5602400E−02 | −7.1632791E−03 | 1.7587259E−03 | −6.8610014E−05 | −7.6624038E−05 |
| 11 | 5.6625283E−02 | −2.2116820E−02 | 3.6642130E−03 | 6.6521267E−04 | −4.5483826E−04 |
| 12 | 2.9967001E−02 | −9.0896238E−03 | 1.1659738E−03 | 1.6402675E−04 | −8.6860945E−05 |
| 13 | 3.7930512E−03 | −9.9721918E−04 | 1.0829318E−04 | 1.7216381E−05 | −7.0454220E−06 |
| 14 | −1.0151108E−03 | 2.5175323E−04 | −1.9909139E−05 | −2.7048316E−06 | 7.2265017E−07 |

| | A12 | A13 | A14 | A15 | A16 |
|---|---|---|---|---|---|
| 2 | 3.3235723E−03 | 5.6387316E−04 | −4.1688992E−04 | 7.8401870E−05 | −5.2063253E−06 |
| 3 | −1.4509379E−03 | −2.8526701E−05 | 1.1809819E−04 | −2.5750221E−05 | 1.7559958E−06 |
| 4 | −1.7123177E−02 | −1.8174481E−04 | 2.2131998E−03 | −6.7024521E−04 | 6.7080987E−05 |
| 5 | −3.6048820E−02 | −5.9051977E−03 | 6.8663917E−03 | −1.7502564E−03 | 1.5519537E−04 |
| 6 | 1.7408425E−02 | 1.5329863E−03 | −2.2127504E−03 | 5.0946142E−04 | −3.8400389E−05 |
| 7 | 3.2150407E−02 | −1.3605973E−04 | −2.7451478E−03 | 7.3375889E−04 | −6.5464871E−05 |
| 8 | 4.9146051E−03 | 3.0591143E−04 | −3.8465023E−04 | 7.4853165E−05 | −5.0463095E−06 |
| 9 | 7.0184145E−05 | 6.3341953E−06 | −5.2166040E−06 | 9.1244756E−07 | −5.9226515E−08 |
| 10 | 2.0278574E−05 | −2.3199754E−06 | 8.6679708E−08 | 2.1428401E−08 | −3.1255469E−09 |
| 11 | 7.7609366E−05 | 1.4172770E−06 | −2.3507384E−06 | 3.2082670E−07 | −1.4730182E−08 |
| 12 | 1.1342558E−05 | 2.3327477E−07 | −2.2101464E−07 | 2.2784840E−08 | −7.8568577E−10 |
| 13 | 7.4192540E−07 | 2.3189223E−08 | −1.2293147E−08 | 1.0764342E−09 | −3.2887421E−11 |
| 14 | −5.9053723E−08 | 7.5630149E−10 | 5.1159944E−10 | −8.1194072E−11 | 4.1021768E−12 |

TABLE 9

Example 5
f = 10.700, Bf = 2.121, Fno. = 2.48, 2ω = 77.2

| Si | Ri | Di | Ndj | vdj |
|---|---|---|---|---|
| *1 | 5.09762 | 1.121 | 1.68930 | 53.08 |
| 2 | 19.11871 | 0.984 | 1.99754 | 20.51 |
| *3 | 11.26988 | 0.265 | | |
| 4 (St) | ∞ | 0.311 | | |
| *5 | 27.65800 | 0.800 | 1.54492 | 55.89 |
| *6 | −3149.77221 | 1.327 | | |
| *7 | −27.44493 | 0.847 | 1.64170 | 22.45 |
| *8 | 26.82311 | 0.208 | | |
| *9 | −15.23044 | 2.516 | 1.54492 | 55.89 |
| *10 | −4.01794 | 0.241 | | |
| *11 | 41.24786 | 1.287 | 1.64170 | 22.45 |
| *12 | 23.09512 | 0.533 | | |
| *13 | 8.98538 | 1.536 | 1.53409 | 55.87 |
| *14 | 3.18211 | 1.231 | | |
| 15 | ∞ | 0.250 | 1.51633 | 64.14 |
| 16 | ∞ | 0.725 | | |
| 17 (IMG) | ∞ | | | |

*aspherical surface

TABLE 10

Example 5: Aspherical Surface Data

| Surface Number | KA | A3 | A4 | A5 | A6 |
|---|---|---|---|---|---|
| 1 | −6.3457568E+00 | 4.4933556E−16 | −6.5312425E−03 | 5.0045097E−02 | −8.6397845E−02 |
| 3 | 2.7469923E+00 | 0.0000000E+00 | 2.5813055E−03 | −2.0346612E−02 | 5.7390974E−02 |
| 5 | −7.2196524E+00 | 8.1986497E−16 | 1.5192088E−02 | −7.8032967E−02 | 1.5682238E−01 |
| 6 | 4.9890656E+01 | −2.5060083E−16 | −2.4885948E−02 | 8.5624741E−02 | −1.6749463E−01 |
| 7 | 4.6834652E+01 | 1.2219291E−15 | −6.3678307E−02 | 2.1181445E−01 | −4.0319664E−01 |
| 8 | 3.6454012E+01 | −7.5109805E−16 | −5.8259294E−02 | 1.4163126E−01 | −2.0902905E−01 |
| 9 | −8.0617740E+00 | 2.2556042E−17 | −1.3395714E−02 | 8.6622273E−03 | −3.6034638E−03 |
| 10 | 4.5906571E−02 | −4.9892151E−16 | −1.0255981E−02 | 1.2403879E−02 | −1.0175567E−02 |
| 11 | −2.5003901E+01 | −1.9098152E−15 | −1.4738552E−02 | 3.2316725E−02 | −3.2367392E−02 |
| 12 | −1.0647593E+01 | −1.4534309E−15 | −1.3837986E−02 | 2.4533890E−02 | −1.9957080E−02 |
| 13 | −1.2699996E+00 | −5.1481738E−16 | −3.2062464E−02 | 1.4430763E−02 | −4.3108543E−03 |
| 14 | −4.5614528E+00 | −1.1929544E−16 | −1.2490499E−02 | 3.7011728E−03 | 3.0520826E−04 |

| | A7 | A8 | A9 | A10 | A11 |
|---|---|---|---|---|---|
| 1 | 8.0859979E−02 | −4.0048382E−02 | 5.0126821E−03 | 5.4706521E−03 | −3.1545950E−03 |
| 3 | −8.4061223E−02 | 6.7758319E−02 | −2.5067305E−02 | −3.4135219E−03 | 7.3086720E−03 |
| 5 | −1.7735014E−01 | 1.1142595E−01 | −2.6074164E−02 | −1.3211167E−02 | 1.1743302E−02 |
| 6 | 1.8620494E−01 | −1.1679196E−01 | 2.9874926E−02 | 9.9713643E−03 | −9.9867880E−03 |
| 7 | 4.3546915E−01 | −2.6973533E−01 | 7.6381255E−02 | 1.1593464E−02 | −1.6678679E−02 |
| 8 | 1.7980481E−01 | −8.6688433E−02 | 1.6431971E−02 | 4.9136276E−03 | −3.5909851E−03 |
| 9 | 2.6136576E−03 | −1.4702680E−03 | 2.6115496E−04 | 9.7738532E−05 | −5.1088570E−05 |
| 10 | 5.7477602E−03 | −2.1391747E−03 | 4.5828030E−04 | −2.2539630E−05 | −1.4208576E−05 |
| 11 | 1.8055099E−02 | −5.7929459E−03 | 7.9907041E−04 | 1.1736742E−04 | −6.8107214E−05 |
| 12 | 8.8278965E−03 | −2.1931366E−03 | 2.2954172E−04 | 2.6568382E−05 | −1.1479922E−05 |
| 13 | 1.3256554E−03 | −2.9673804E−04 | 2.6678628E−05 | 3.6918683E−06 | −1.2224215E−06 |
| 14 | −3.8611923E−04 | 8.2019864E−05 | −4.5907289E−06 | −7.3435751E−07 | 1.2329110E−07 |

| | A12 | A13 | A14 | A15 | A16 |
|---|---|---|---|---|---|
| 1 | 5.4733062E−04 | 7.9230865E−05 | −4.9538959E−05 | 7.9485792E−06 | −4.5409368E−07 |
| 3 | −2.5080777E−03 | −2.4014210E−05 | 2.2913263E−04 | −5.7436472E−05 | 4.6936091E−06 |
| 5 | −2.7910460E−03 | −3.6519105E−04 | 3.3736742E−04 | −6.8684462E−05 | 4.8893713E−06 |
| 6 | 2.4920997E−03 | 1.8493815E−04 | −2.2243418E−04 | 4.2918859E−05 | −2.7203208E−06 |
| 7 | 4.7196605E−03 | −1.3258324E−05 | −2.8470831E−04 | 6.2914857E−05 | −4.5972792E−06 |
| 8 | 6.9746535E−04 | 3.6511931E−05 | −3.8343484E−05 | 6.2734180E−06 | −3.5681163E−07 |
| 9 | 6.5762999E−06 | 6.2857671E−07 | −3.4592278E−07 | 6.1824806E−08 | −4.7340163E−09 |
| 10 | 3.5887724E−06 | −3.1337567E−07 | −8.5594662E−10 | 2.0850537E−09 | −1.3069870E−10 |
| 11 | 9.7515953E−06 | 1.4459006E−07 | −2.0257799E−07 | 2.2632678E−08 | −8.4012450E−10 |
| 12 | 1.2290269E−06 | 2.0499052E−08 | −1.6072931E−08 | 1.3572089E−09 | −3.8199006E−11 |
| 13 | 1.0573957E−07 | 2.8296002E−09 | −1.2402259E−09 | 9.2754343E−11 | −2.4569825E−12 |
| 14 | −6.9644639E−09 | 1.8739275E−10 | 3.9581873E−11 | −7.9015367E−12 | 3.7513479E−13 |

TABLE 11

| | | Values Related to Conditional Formulae | | | | |
|---|---|---|---|---|---|---|
| Formula | Condition | Example 1 | Example 2 | Example 3 | Example 4 | Example 5 |
| 1 | f/f7 | −1.17 | −0.85 | −0.95 | −0.99 | −1.05 |
| 2 | f/f6 | 0.04 | −0.25 | −0.27 | −0.16 | −0.13 |
| 3 | f/f3 | 0.33 | 0.23 | 0.25 | 0.19 | 0.21 |
| 4 | f · tanω/L7r | 2.89 | 2.21 | 2.53 | 2.70 | 2.68 |
| 5 | (L7f − L7r)/(L7f + L7r) | 0.49 | 0.46 | 0.45 | 0.45 | 0.48 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient K. and the measured data, using a fitting function of UA3P. $C=1/R_m$ and $KA=K_m-1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C., using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number vd with respect to the d line is obtained by calculations, substituting the values of Nd, NF, and NC obtained by the above measurements into the formula below.

$vd=(Nd-1)/(NF-NC)$

What is claimed is:

1. An imaging lens consisting essentially of seven lenses, including:
    a first lens having a positive refractive power and a convex surface toward the object side;
    a second lens, of which at least one surface is of an aspherical shape;
    a third lens, of which at least one surface is of an aspherical shape;
    a fourth lens, of which at least one surface is of an aspherical shape;
    a fifth lens having a positive refractive power and is of a meniscus shape with a convex surface toward the image side;
    a sixth lens, of which at least one surface is of an aspherical shape; and
    a seventh lens having a negative refractive power and a concave surface toward the image side, provided in this order from the object side;
    the imaging lens satisfying the following conditional formula:

$-1.25<f/f7<-0.5$ (1)

wherein f is the focal length of the entire system, and f7 is the focal length of the seventh lens.

2. An imaging lens as defined in claim 1 that further satisfies the following conditional formula:

$-0.6<f/f6<0.3$ (2)

wherein f6 is the focal length of the sixth lens.

3. An imaging lens as defined in claim 1 that further satisfies the following conditional formula:

$0<f/f3<0.35$ (3)

wherein f3 is the focal length of the third lens.

4. An imaging lens as defined in claim 1 that further satisfies the following conditional formula:

$0.5<f\tan\omega/L7r<10$ (4)

wherein ω is the half value of a maximum angle of view when focused on an object at infinity, and L7r is the paraxial radius of curvature of the surface of the seventh lens toward the image side.

5. An imaging lens as defined in claim 1, wherein: the second lens has a negative refractive power.

6. An imaging lens as defined in claim 1, wherein: the third lens has a positive refractive power.

7. An imaging lens as defined in claim 1, wherein: the fourth lens has a negative refractive power.

8. An imaging lens as defined in claim 1, wherein:
the seventh lens is of a meniscus shape having a convex surface toward the object side.

9. An imaging lens as defined in claim 1, wherein:
the first lens is of a meniscus shape having a convex surface toward the object side.

10. An imaging lens as defined in claim 1, wherein:
the sixth lens is of a meniscus shape having a convex surface toward the object side.

11. An imaging lens as defined in claim 1, wherein:
the fourth lens is of a biconcave shape.

12. An imaging lens as defined in claim 1 that further satisfies the following conditional formula:

$$0.15 < (L7f - L7r)/(L7f + L7r) < 0.55 \quad (5)$$

wherein L7r is the paraxial radius of curvature of the surface of the seventh lens toward the image side, and L7f is the paraxial radius of curvature of the surface of the seventh lens toward the object side.

13. An imaging lens as defined in claim 1 that further satisfies the following conditional formula:

$$-1.24 < f/f7 < -0.7 \quad (1-1)$$

14. An imaging lens as defined in claim 1 that further satisfies the following conditional formula:

$$-0.45 < f/f6 < 0.15 \quad (2-1)$$

wherein f6 is the focal length of the sixth lens.

15. An imaging lens as defined in claim 1 that further satisfies the following conditional formula:

$$1.5 < f \tan \omega / L7r < 5 \quad (4-1)$$

wherein ω is the half value of a maximum angle of view when focused on an object at infinity, and L7r is the paraxial radius of curvature of the surface of the seventh lens toward the image side.

16. An imaging lens as defined in claim 1 that further satisfies the following conditional formula:

$$0.3 < (L7f - L7r)/(L7f + L7r) < 0.55 \quad (5-1)$$

wherein L7r is the paraxial radius of curvature of the surface of the seventh lens toward the image side, and L7f is the paraxial radius of curvature of the surface of the seventh lens toward the object side.

17. An imaging lens as defined in claim 1 that further satisfies the following conditional formula:

$$-1.2 < f/f7 < -0.8 \quad (1-2).$$

18. An imaging lens as defined in claim 1 that further satisfies the following conditional formula:

$$-0.3 < f/f6 < 0.1 \quad (2-2)$$

wherein f6 is the focal length of the sixth lens.

19. An imaging lens as defined in claim 1, wherein:
the first lens and the second lens are cemented together; and
the joint surface between the first lens and the second lens is of an aspherical shape.

20. An imaging apparatus equipped with an imaging lens as defined in claim 1.

* * * * *